(12) United States Patent
Perez et al.

(10) Patent No.: US 10,901,376 B2
(45) Date of Patent: Jan. 26, 2021

(54) BUILDING MANAGEMENT SYSTEM WITH SELF-OPTIMIZING CONTROL MODELING FRAMEWORK

(71) Applicant: Johnson Controls Technology Company, Auburn Hills, MI (US)

(72) Inventors: Carlos Felipe Alcala Perez, Milwaukee, WI (US); Timothy I. Salsbury, Mequon, WI (US); John M. House, Saint-Leonard (CA)

(73) Assignee: Johnson Controls Technology Company, Auburn Hills, MI (US)

( * ) Notice: Subject to any disclaimer, the term of this patent is extended or adjusted under 35 U.S.C. 154(b) by 104 days.

(21) Appl. No.: 16/381,851

(22) Filed: Apr. 11, 2019

(65) Prior Publication Data
US 2020/0326676 A1  Oct. 15, 2020

(51) Int. Cl.
*G05B 13/04* (2006.01)
*G05B 19/02* (2006.01)
(Continued)

(52) U.S. Cl.
CPC ......... *G05B 13/041* (2013.01); *G05B 13/042* (2013.01); *G05B 13/047* (2013.01);
(Continued)

(58) Field of Classification Search
CPC .. G05B 13/041; G05B 13/042; G05B 13/047; G05B 13/048; G05B 19/02;
(Continued)

(56) References Cited

U.S. PATENT DOCUMENTS 3,617,717 A * 11/1971 Smith ................ G05B 13/0225
700/8
8,027,742 B2 9/2011 Seem et al.
(Continued)

OTHER PUBLICATIONS

Y. Cao, "Self-optimizing control structure selection via differentiation," 2003 European Control Conference (ECC), Cambridge, UK, 2003, pp. 2867-2872. (Year: 2003).*

(Continued)

*Primary Examiner* — Crystal J Barnes-Bullock
(74) *Attorney, Agent, or Firm* — Foley & Lardner LLP

(57) ABSTRACT

A self-optimizing controller for equipment of a plant provides a manipulated variable as an input to the plant and receives an output variable as feedback. The controller generates a performance variable model defining the performance variable as a function of the manipulated variable and an output variable model defining the output variable as a function of the manipulated variable. The controller uses the performance variable model to determine a gradient of the performance variable, uses the output variable model to determine a gradient of the output variable, and generates a self-optimizing variable based on the gradient of the performance variable model and the gradient of the output variable model. The controller operates the equipment of the plant to affect a variable state or condition of the building based on the value of the self-optimizing variable from the self-optimizing variable model.

20 Claims, 15 Drawing Sheets

(51) Int. Cl.
  *G06N 20/10* (2019.01)
  *G06N 20/20* (2019.01)
  *G05B 19/048* (2006.01)

(52) U.S. Cl.
  CPC .......... *G05B 13/048* (2013.01); *G05B 19/02* (2013.01); *G05B 19/048* (2013.01); *G06N 20/10* (2019.01); *G06N 20/20* (2019.01); *G05B 2219/24053* (2013.01); *G05B 2219/2614* (2013.01); *G05B 2219/43112* (2013.01)

(58) Field of Classification Search
  CPC ........ G05B 19/048; G05B 2219/24053; G05B 2219/2614; G05B 2219/43112; G06N 20/10; G06N 20/20
  See application file for complete search history.

(56) References Cited

U.S. PATENT DOCUMENTS

| | | | | |
|---|---|---|---|---|
| 8,447,443 | B1* | 5/2013 | Ryan | G05B 13/042 701/3 |
| 8,467,888 | B2* | 6/2013 | Gahinet | G05B 11/42 700/30 |
| 8,478,433 | B2 | 7/2013 | Seem et al. | |
| 8,577,822 | B2* | 11/2013 | Kusiak | G05B 17/02 706/45 |
| 8,755,916 | B2* | 6/2014 | Lou | F23C 9/00 700/36 |
| 9,355,069 | B2* | 5/2016 | ElBsat | G05B 15/02 |
| 9,581,985 | B2 | 2/2017 | Walser et al. | |
| 9,886,008 | B1* | 2/2018 | Gahinet | G05B 13/021 |
| 10,209,684 | B2 | 2/2019 | Salsbury et al. | |
| 10,401,843 | B2* | 9/2019 | House | F24F 11/63 |
| 10,627,124 | B2* | 4/2020 | Walser | G05B 19/048 |
| 10,635,055 | B2* | 4/2020 | ElBsat | G05B 13/048 |
| 10,732,585 | B2* | 8/2020 | Salsbury | G05B 13/024 |
| 10,739,741 | B2* | 8/2020 | Wenzel | G06Q 50/163 |
| 2012/0035748 | A1* | 2/2012 | Gahinet | G05B 13/047 700/31 |
| 2012/0150707 | A1* | 6/2012 | Campbell | G06Q 30/04 705/34 |
| 2016/0365735 | A1* | 12/2016 | Raczynski | G05B 13/04 |
| 2017/0159962 | A1 | 6/2017 | Walser et al. | |
| 2019/0041077 | A1* | 2/2019 | Salsbury | G05B 13/024 |
| 2019/0137952 | A1 | 5/2019 | Salsbury et al. | |
| 2019/0293308 | A1* | 9/2019 | Salsbury | F24F 5/0035 |
| 2020/0089174 | A1* | 3/2020 | Perez | F24F 11/84 |

OTHER PUBLICATIONS

U.S. Appl. No. 16/131,927, filed Sep. 14, 2018, Johnson Controls Technology Company.

Alstad, Vidar and Sigurd Skogestad, Null space method for selecting optimal measurement combinations as controlled variables, Industrial & engineering chemistry research, 46(3):846-853, 2007.

Alstad, Vidar, Studies on selection of controlled variables, PhD thesis, 2005. 238 pages.

Altman, Naomi S., An introduction to kernel and nearest-neighbor nonparametric regression, The American Statistician, 46(3):175-185, 1992.

Breiman, Leo, Jerome Friedman, Charles J. Stone, and R. A. Olshen, Classification and Regression Trees, Chapman & Hall, New York, 1993, Chapter 8, 53 pages.

Breiman, Leo, Random forests, Machine learning, 45(1):5-32, 2001.

Duda, Richard O., Peter E. Har, and David G. Stork, Multilayer Neural Networks, In Pattern Classification, John Wiley & Sons, Inc., New York, NY, 2nd edition, 2001. 71 pages.

Francois, Gregory, Balasubrahmanya Srinivasan, and Dominique Bonvin, Use of measurements for enforcing the necessary conditions of optimality in the presence of constraints and uncertainty, Journal of Process Control, 15(6):701-712, 2005.

Geladi, P. and B. R. Kowalski, Partial least-squares regresion: a tutorial, Analytica Chimica Acta, 185:1-17, 1986.

Halvorsen, Ivar J., Sigurd Skogestad, John C. Morud, and Vidar Alstad, Optimal selection of controlled variables, Industrial Engineering Chemistry Research, 42(14):3273-3284, 2003.

Hastie, Trevor and Robert Tibshirani, Generalized additive models, In Statistical Models in S, pp. 249-307, Routledge, 2017.

Hastie, Trevor, Robert Tibshirani, and Jerome Friedman, The Elements of Statistical Learning, Data mining, Inference, and Prediction, Springer, New York, 2009. 12 pages.

Jaschke, Johannes and Sigurd Skogestad, Controlled variables from optimal operation data, In Computer Aided Chemical Engineering, vol. 29, pp. 753-757, Elsevier, 2011.

Jaschke, Johannes and Sigurd Skogestad, NCO tracking and self-optimizing control in the context of real-time optimization, Journal of Process Control, 21(10):1407-1416, 2011.

Jaschke, Johannes and Sigurd Skogestad, Using process data for finding self-optimizing controlled variables, vol. 46, pp. 451-456, Elsevier, 2013.

Kariwala, Vinay, Optimal measurement combination for local self-optimizing control, Industrial & Engineering Chemistry Research, 46(11):3629-3634, 2007.

Madsen, Henrik and Poul Thyregod, Introduction to general and generalized linear models, CRC Press Imprint of the Taylor & Francis Group, Boca Raton, FL, 2011. 25 pages.

Salsbury, Timothy I., John M. House, Carlos F. Alcala, and Yaoyu Li, An extremum-seeking control method driven by input-output correlation, Journal of Process Control, 58:106-116, 2017.

Seber, G. A. and A. J. Lee, Linear Regression Analysis, Wiley-Interscience, 2003. 12 pages.

Seber, George A. F. and C. J. Wild, Nonlinear Regression, John Wiley & Sons, New Jersey, 2003. 14 pages.

Suykens, Johan, Least Squares Support Vector Machines, World Scientific, River Edge, NJ, 2002. 84 pages.

Thomas, George B. and Ross L. Finney, Calculus and Analytic Geometry, Addison-Wesley Publishing Company, Reading, Massachusetts, 1996, Section 8.9, pp. 9 pages.

Venables, W. N. and B. D. Ripley, Modern Applied Statistics with S. Springer, New York, fourth edition, 2002, ISBN 0-387-95457-0. 7 pages.

Ye, Lingjian, Yi Cao, Yingdao Li and Zhihuan Song, A data-driven approach for selecting controlled variables, vol. 45, pp. 904-909, Elsevier, 2012.

\* cited by examiner

BUILDING MANAGEMENT SYSTEM WITH SELF-OPTIMIZING CONTROL MODELING FRAMEWORK

BACKGROUND

The present disclosure relates generally to control systems for an HVAC system. More particularly, the present disclosure relates to self-optimizing control for a plant.

Systems in buildings are primarily controlled to maintain comfort conditions for occupants. The complexity and redundancy present in most building systems make it possible to satisfy comfort conditions in a myriad of different ways. One example of this is when cold air is circulated through a room to meet a temperature setpoint. In this case, the setpoint could be maintained through different combinations of supply air temperature and volume, e.g., room temperatures could be lowered by either increasing air flow or reducing the temperature of the supply air. The cost of air flow is governed by the fan and the cost of lowering the air temperature is dominated in most cooling applications by compressor energy. A trade-off therefore exists that can be exploited in order to minimize total costs whilst still satisfying comfort.

The trade-offs inherent in building systems can be managed by applying optimization methods that make adjustments to system operation. For the air flow example, the temperature of the air delivered to the room is usually controlled to a fixed setpoint. Conventional feedback control structures are usually designed for regulation to constant setpoints, which satisfies control objectives but leads to optimization cost function measures varying with system operating points and disturbances. An optimization method could be used to adjust this setpoint to minimize the total cost of the fans and chiller plant. This situation is common in complex systems where a network of controllers operate to maintain setpoints and an optimization method is used to adjust the setpoints based on a desired cost function. Standard terminology for the optimization functionality is "real-time optimization layer" (RTO layer). An RTO layer may increase the computational requirements of building systems and increase system complexity.

An alternative approach known as self-optimizing control (SOC) was developed by recognizing that the RTO layer is only needed because the control layer that includes the feedback controllers essentially controls the wrong variables from a holistic control and optimization perspective. The purpose of SOC is to design the control structure so that regulation at constant setpoints maintains not only control objectives but also optimization targets.

SUMMARY

One implementation of the present disclosure is a building management system. The building management system includes a plant, and a self-optimizing controller. The plant includes building equipment operable to affect a variable state or condition of a building, according to some embodiments. The plant operates at a cost indicated by a performance variable, according to some embodiments. The self-optimizing controller is configured to provide a manipulated variable as a control input to the plant and receive an output variable as a feedback from the plant, according to some embodiments. The self-optimizing controller is further configured to generate a performance variable model that defines the performance variable as a function of the output variable and the manipulated variable, according to some embodiments. The self-optimizing controller is further configured to generate an output variable model that defines the output variable as a function of the manipulated variable, according to some embodiments. The self-optimizing controller is further configured to use the performance variable model to determine a gradient of the performance variable with respect to at least one of the output variable and the manipulated variable, according to some embodiments. The self-optimizing controller is further configured to use the output variable model to determine a gradient of the output variable with respect to the manipulated variable, according to some embodiments. The self-optimizing controller is further configured to generate a model of a self-optimizing variable based on the gradient of the performance variable model and the gradient of the output variable model, according to some embodiments. The self-optimizing controller is further configured to operate the building equipment of the plant to affect the variable state or condition of the building based on a value of the self-optimizing variable defined by the self-optimizing variable model, according to some embodiments.

In some embodiments, the performance variable model and the output variable model are generated using a regression technique.

In some embodiments, the regression technique is any of a linear regression, a Taylor expansion, a support vector machine, a K-nearest neighbor regression, a partial leas square fit regression, a regression tree, a generalized linear model, a neural network, and a random forest.

In some embodiments, determining the gradient of the performance variable with respect to at least one of the output variable and the manipulated variable includes determining a first partial derivative of the performance variable with respect to the manipulated variable, and determining a second partial derivative of the performance variable with respect to the output variable.

In some embodiments, the self-optimizing controller is configured to perturb the manipulated variable with a step input to determine values of the manipulated variable over a time duration and provide the values of the manipulated variable over the time duration to the plant as the control input.

In some embodiments, the performance variable model is generated based on a set of values of the performance variable, the manipulated variable, and the output variable.

In some embodiments, the output variable model is generated based on a set of values of the output variable and the manipulated variable.

In some embodiments, the self-optimizing controller is configured to generate control signals for the building equipment such that the self-optimizing variable is driven toward zero.

In some embodiments, the output variable of the plant is influenced by a disturbance. In some embodiments, the performance variable is influenced by the disturbance.

Another implementation of the present disclosure is a self-optimizing controller for building equipment of a plant. The controller is configured to provide a manipulated variable as a control input to the plant and receive an output variable as a feedback from the plant, according to some embodiments. The controller is further configured to generate a performance variable model that defines the performance variable as a function of the manipulated variable, according to some embodiments. The controller is further configured to generate an output variable model that defines the output variable as a function of the manipulated variable, according to some embodiments. The controller is further configured to use the performance variable model to determine a gradient of the performance variable with respect to at least one of the output variable and the manipulated variable, according to some embodiments. The controller is further configured to use the output variable model to determine a gradient of the output variable with respect to the manipulated variable, according to some embodiments. The controller is further configured to generate a self-optimizing variable based on the gradient of the performance variable model and the gradient of the output variable model, according to some embodiments. The controller is further configured to operate the building equipment of the plant to affect a variable state or condition of the building based on the value of the self-optimizing variable defined by the self-optimizing variable model, according to some embodiments.

In some embodiments, the performance variable model and the output variable model are generated using a regression technique.

In some embodiments, the regression technique is any of a linear regression, a Taylor expansion, a support vector machine, a K-nearest neighbor regression, a partial leas square fit regression, a regression tree, a generalized linear model, a neural network, and a random forest.

In some embodiments, determining the gradient of the performance with respect to at least one of the output variable and the manipulated variable includes determining a first partial derivative of the performance variable with respect to the manipulated variable, and determining a second partial derivative of the performance variable with respect to the output variable.

In some embodiments, the controller is configured to perturb the manipulated variable with a step input to determine values of the manipulated variable over a time duration and provide the values of the manipulated variable over the time duration to the plant as the control input.

In some embodiments, the performance variable model is generated based on a set of values of the performance variable, the manipulated variable, and the output variable.

In some embodiments, the output variable model is generated based on a set of values of the output variable and the manipulated variable.

In some embodiments, the controller is further configured to generate control signals for the building equipment such that the self-optimizing variable is driven toward zero.

Another implementation of the present disclosure is a method for performing self-optimizing control on a plant. The method includes providing a manipulated variable as a control input to the plant and receiving an output variable as a feedback from the plant, according to some embodiments. The method further includes generating a performance variable model that defines the performance variable as a function of the output variable and the manipulated variable, according to some embodiments. The method further includes generating an output variable model that defines the output variable as a function of the manipulated variable, according to some embodiments. The method further includes using the performance variable model to determine a gradient of the performance variable with respect to at least one of the output variable and the manipulated variable, according to some embodiments. The method further includes using the output variable model to determine a gradient of the output variable with respect to the manipulated variable, according to some embodiments. The method further includes generating a model of a self-optimizing variable based on the gradient of the performance variable model and the gradient of the output variable model, according to some embodiments. The method further includes operating the building equipment of the plant to affect the variable state or condition of the building based on a value of the self-optimizing variable defined by the self-optimizing variable model, according to some embodiments.

In some embodiments, using the performance variable model to determine a gradient of the performance variable includes determining a first partial derivative of the performance variable with respect to the manipulated variable, and determining a second partial derivative of the performance variable with respect to the output variable.

In some embodiments, the method further includes generating control signals for the building equipment such that the self-optimizing variable is driven toward zero.

DETAILED DESCRIPTION

Overview

Referring generally to the FIGURES, a self-optimizing control system is shown, according to some embodiments. The self-optimizing control system includes a self-optimizing controller that can be used to calculate a self-optimizing variable and operate building equipment of a plant based on the self-optimizing variable. The self-optimizing controller can perturb a manipulated variable u of the building equipment and collect training data from sensors of the plant over a time period.

The self-optimizing controller may build a model that calculates process cost J (e.g., coefficient of performance) as a function of process measurements/inputs y and u (e.g., a performance variable and the manipulated variable of the plant), and a model that calculates the process measurements y (e.g., the performance variable of the plant) as a function of the process inputs u. The self-optimizing controller can use the collected training data and a regression technique (e.g., a linear regression, a neural network, a non-linear regression, etc.) to generate the models. The self-optimizing controller can then determine derivatives (e.g., gradients) of the models and multiply the models by each other, according to some embodiments. This provides a gradient of a cost function with respect to the process inputs u. This can then be used as the self-optimizing variable (i.e., c). The self-optimizing controller can then operate the building equipment of the plant based on the self-optimizing variable. The self-optimizing controller may operate the building equipment of the plant to affect an environmental condition of a building based on the self-optimizing variable.

Building HVAC Systems and Building Management Systems

Figure 1:
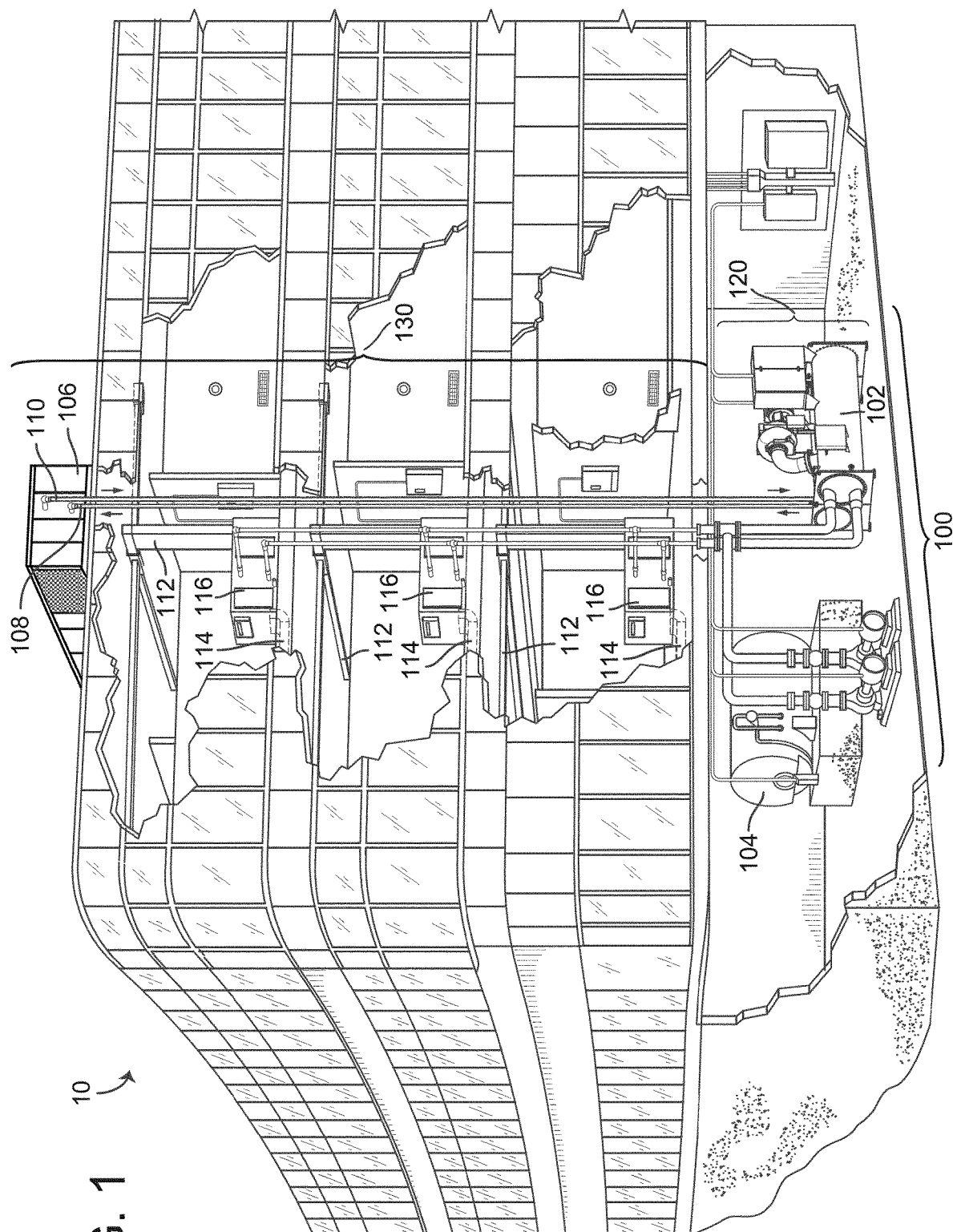
FIG. 1 is a drawing of a building equipped with a HVAC system, according to some embodiments.
Figure 2:
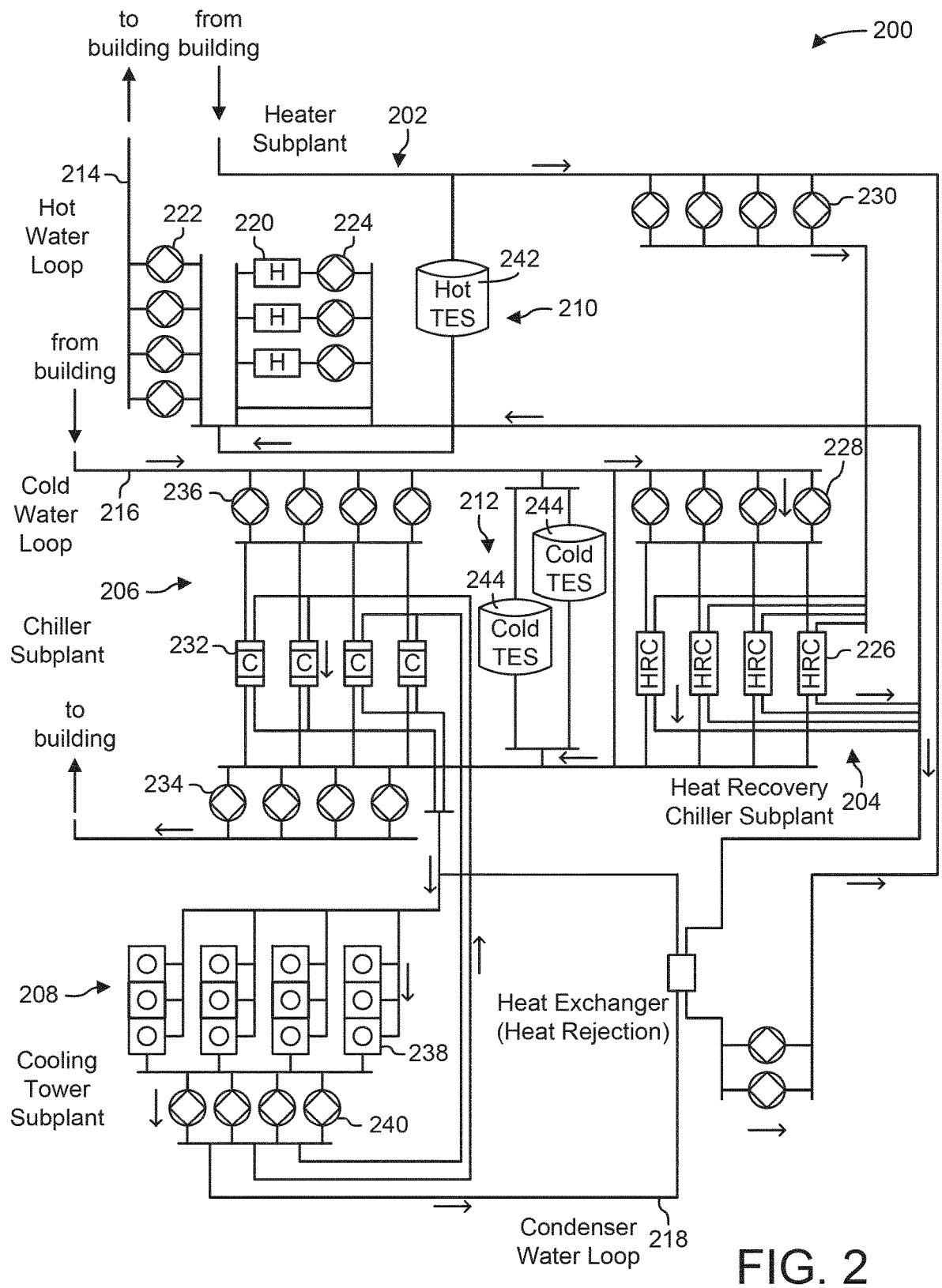
FIG. 2 is a block diagram of a waterside system which can be used to serve the building of FIG. 1, according to some embodiments.
Figure 3:
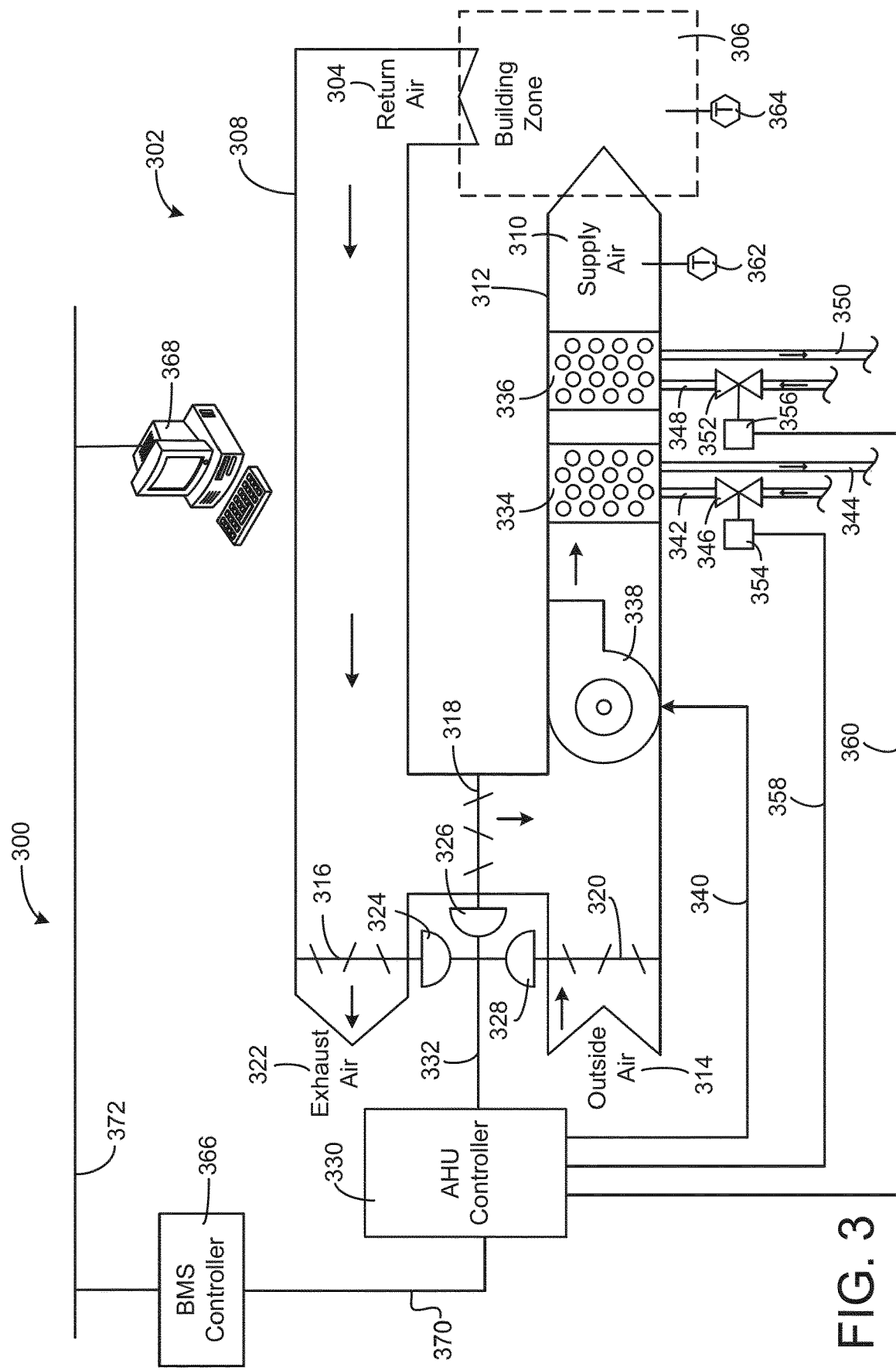
FIG. 3 is a block diagram of an airside system which can be used to serve the building of FIG. 1, according to some embodiments.
Figure 4:
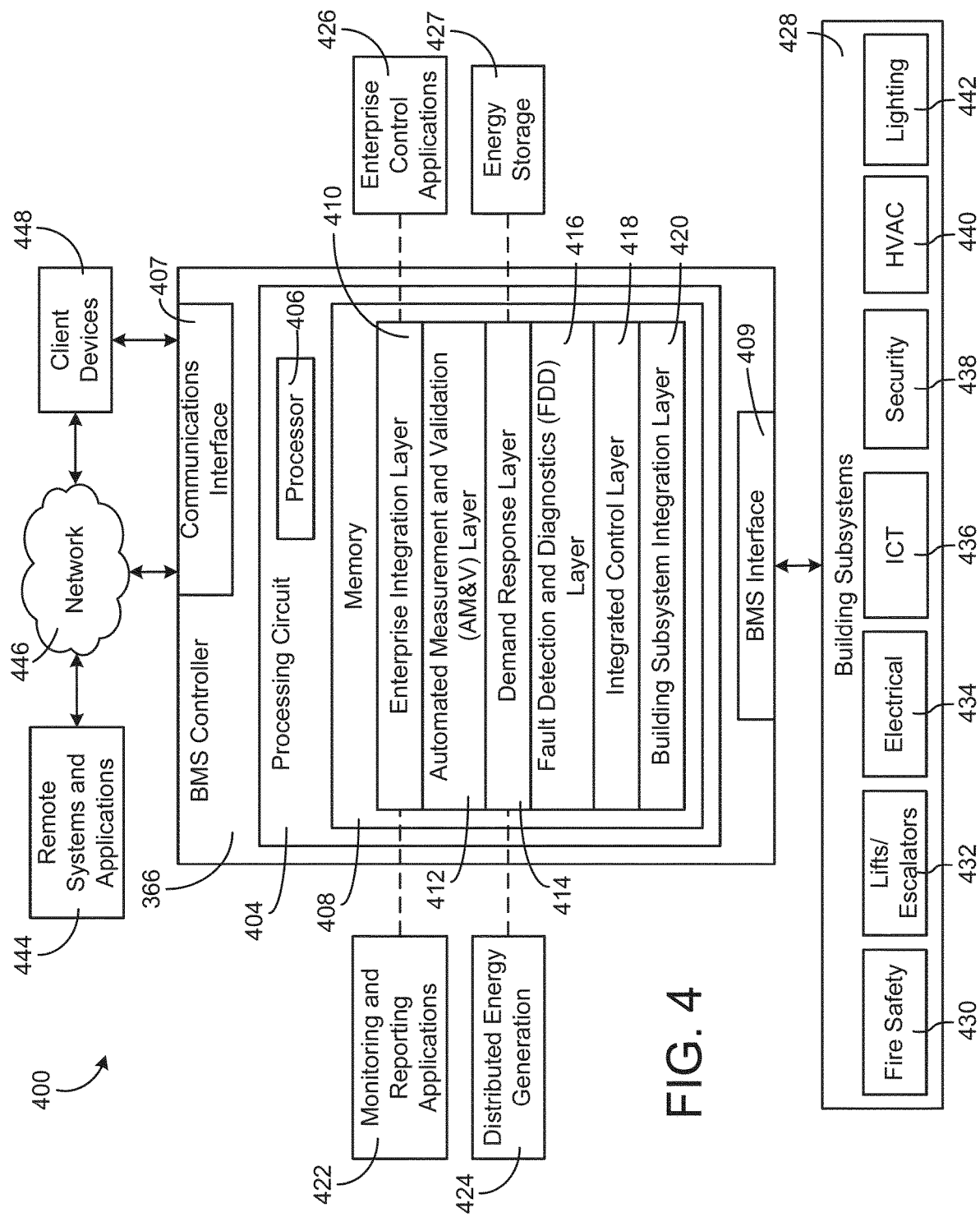
FIG. 4 is a block diagram of a building management system (BMS) which can be used to monitor and control the building of FIG. 1, according to some embodiments.
Figure 5:
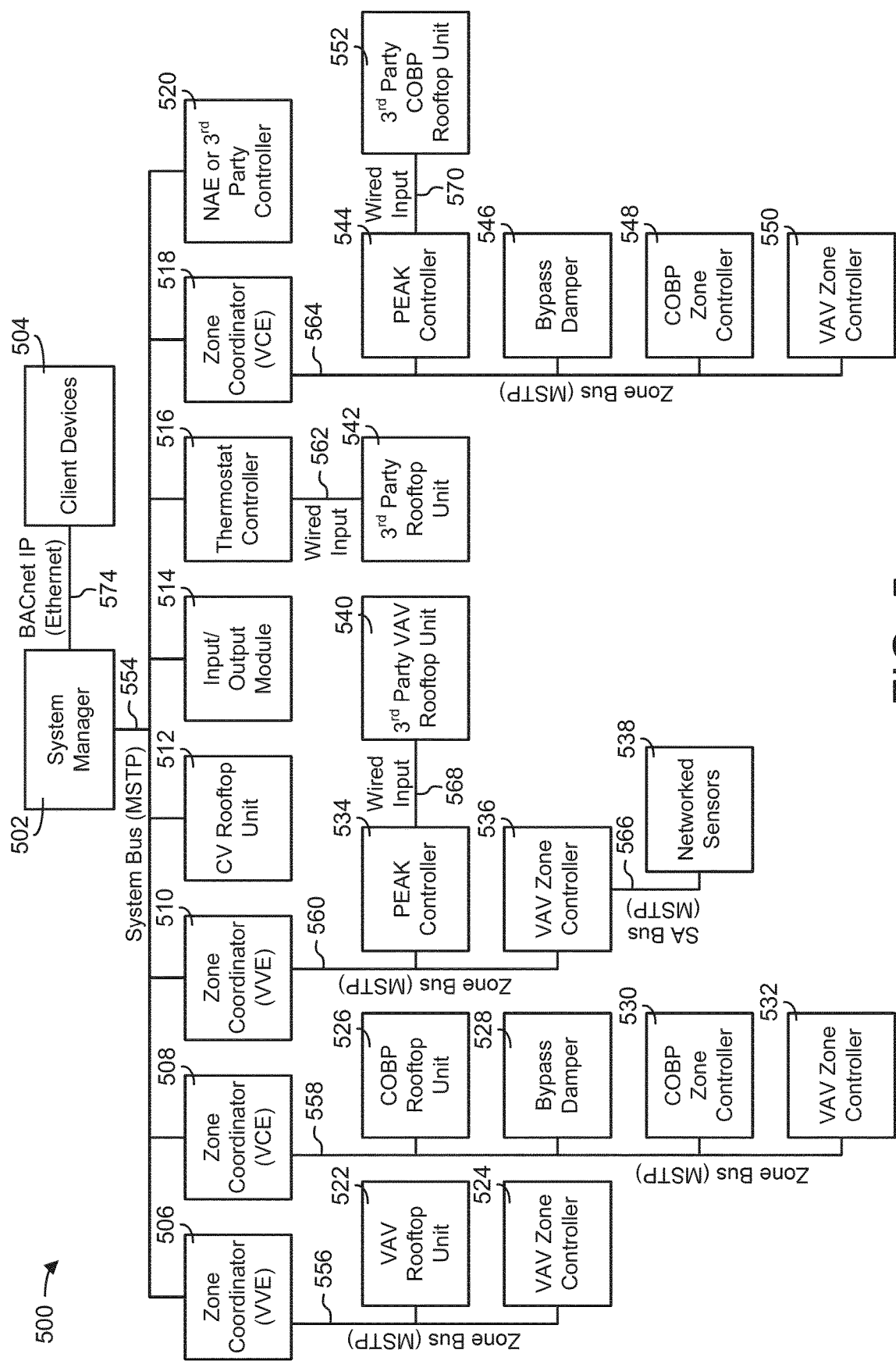
FIG. 5 is a block diagram of another BMS which can be used to monitor and control the building of FIG. 1, according to some embodiments.

Referring now to FIGS. 1-5, several building management systems (BMS) and HVAC systems in which the systems and methods of the present disclosure can be implemented are shown, according to some embodiments. In brief overview, FIG. 1 shows a building 10 equipped with a HVAC system 100. FIG. 2 is a block diagram of a waterside system 200 which can be used to serve building 10. FIG. 3 is a block diagram of an airside system 300 which can be used to serve building 10. FIG. 4 is a block diagram of a BMS which can be used to monitor and control building 10. FIG. 5 is a block diagram of another BMS which can be used to monitor and control building 10.

Building and HVAC System

Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes a HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 may place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 may transfer heat between the airflow and the working fluid to provide heating or cooling for the airflow. For example, AHU 106 can include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Waterside System

Referring now to FIG. 2, a block diagram of a waterside system 200 is shown, according to some embodiments. In various embodiments, waterside system 200 may supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and may operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) can be used in place of or in addition to water to serve thermal energy loads. In other embodiments, subplants 202-212 may provide heating and/or cooling directly to the building or campus without requiring an intermediate heat transfer fluid. These and other variations to waterside system 200 are within the teachings of the present disclosure.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Airside System

Referring now to FIG. 3, a block diagram of an airside system 300 is shown, according to some embodiments. In various embodiments, airside system 300 may supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 may operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 may communicate with an AHU controller 330 via a communications link 332. Actuators 324-328 may receive control signals from AHU controller 330 and may provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU 330 may control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Building Management Systems

Referring now to FIG. 4, a block diagram of a building management system (BMS) 400 is shown, according to some embodiments. BMS 400 can be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 may facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 may also facilitate communications between BMS controller 366 and client devices 448. BMS interface 409 may facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a Wi-Fi transceiver for communicating via a wireless communications network. In another example, one or both of interfaces 407, 409 can include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to some embodiments, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 can be configured to manage communications between BMS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 may receive inputs from other layers of BMS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to some embodiments, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In some embodiments, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 may compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to some embodiments, FDD layer 416 (or a policy executed by an integrated control engine or business rules engine) may shut-down systems or direct control activities around faulty devices or systems to reduce energy waste, extend equipment life, or assure proper control response.

FDD layer 416 can be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BMS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Referring now to FIG. 5, a block diagram of another building management system (BMS) 500 is shown, according to some embodiments. BMS 500 can be used to monitor and control the devices of HVAC system 100, waterside system 200, airside system 300, building subsystems 428, as well as other types of BMS devices (e.g., lighting equipment, security equipment, etc.) and/or HVAC equipment.

BMS 500 provides a system architecture that facilitates automatic equipment discovery and equipment model distribution. Equipment discovery can occur on multiple levels of BMS 500 across multiple different communications busses (e.g., a system bus 554, zone buses 556-560 and 564, sensor/actuator bus 566, etc.) and across multiple different communications protocols. In some embodiments, equipment discovery is accomplished using active node tables, which provide status information for devices connected to each communications bus. For example, each communications bus can be monitored for new devices by monitoring the corresponding active node table for new nodes. When a new device is detected, BMS 500 can begin interacting with the new device (e.g., sending control signals, using data from the device) without user interaction.

Some devices in BMS 500 present themselves to the network using equipment models. An equipment model defines equipment object attributes, view definitions, schedules, trends, and the associated BACnet value objects (e.g., analog value, binary value, multistate value, etc.) that are used for integration with other systems. Some devices in BMS 500 store their own equipment models. Other devices in BMS 500 have equipment models stored externally (e.g., within other devices). For example, a zone coordinator 508 can store the equipment model for a bypass damper 528. In some embodiments, zone coordinator 508 automatically creates the equipment model for bypass damper 528 or other devices on zone bus 558. Other zone coordinators can also create equipment models for devices connected to their zone busses. The equipment model for a device can be created automatically based on the types of data points exposed by the device on the zone bus, device type, and/or other device attributes. Several examples of automatic equipment discovery and equipment model distribution are discussed in greater detail below.

Still referring to FIG. 5, BMS 500 is shown to include a system manager 502; several zone coordinators 506, 508, 510 and 518; and several zone controllers 524, 530, 532, 536, 548, and 550. System manager 502 can monitor data points in BMS 500 and report monitored variables to various monitoring and/or control applications. System manager 502 can communicate with client devices 504 (e.g., user devices, desktop computers, laptop computers, mobile devices, etc.) via a data communications link 574 (e.g., BACnet IP, Ethernet, wired or wireless communications, etc.). System manager 502 can provide a user interface to client devices 504 via data communications link 574. The user interface may allow users to monitor and/or control BMS 500 via client devices 504.

In some embodiments, system manager 502 is connected with zone coordinators 506-510 and 518 via a system bus 554. System manager 502 can be configured to communicate with zone coordinators 506-510 and 518 via system bus 554 using a master-slave token passing (MSTP) protocol or any other communications protocol. System bus 554 can also connect system manager 502 with other devices such as a constant volume (CV) rooftop unit (RTU) 512, an input/output module (IOM) 514, a thermostat controller 516 (e.g., a TEC5000 series thermostat controller), and a network automation engine (NAE) or third-party controller 520. RTU 512 can be configured to communicate directly with system manager 502 and can be connected directly to system bus 554. Other RTUs can communicate with system manager 502 via an intermediate device. For example, a wired input 562 can connect a third-party RTU 542 to thermostat controller 516, which connects to system bus 554.

System manager 502 can provide a user interface for any device containing an equipment model. Devices such as zone coordinators 506-510 and 518 and thermostat controller 516 can provide their equipment models to system manager 502 via system bus 554. In some embodiments, system manager 502 automatically creates equipment models for connected devices that do not contain an equipment model (e.g., IOM 514, third party controller 520, etc.). For example, system manager 502 can create an equipment model for any device that responds to a device tree request. The equipment models created by system manager 502 can be stored within system manager 502. System manager 502 can then provide a user interface for devices that do not contain their own equipment models using the equipment models created by system manager 502. In some embodiments, system manager 502 stores a view definition for each type of equipment connected via system bus 554 and uses the stored view definition to generate a user interface for the equipment.

Each zone coordinator 506-510 and 518 can be connected with one or more of zone controllers 524, 530-532, 536, and 548-550 via zone buses 556, 558, 560, and 564. Zone coordinators 506-510 and 518 can communicate with zone controllers 524, 530-532, 536, and 548-550 via zone busses 556-560 and 564 using a MSTP protocol or any other communications protocol. Zone busses 556-560 and 564 can also connect zone coordinators 506-510 and 518 with other types of devices such as variable air volume (VAV) RTUs 522 and 540, changeover bypass (COBP) RTUs 526 and 552, bypass dampers 528 and 546, and PEAK controllers 534 and 544.

Zone coordinators 506-510 and 518 can be configured to monitor and command various zoning systems. In some embodiments, each zone coordinator 506-510 and 518 monitors and commands a separate zoning system and is connected to the zoning system via a separate zone bus. For example, zone coordinator 506 can be connected to VAV RTU 522 and zone controller 524 via zone bus 556. Zone coordinator 508 can be connected to COBP RTU 526, bypass damper 528, COBP zone controller 530, and VAV zone controller 532 via zone bus 558. Zone coordinator 510 can be connected to PEAK controller 534 and VAV zone controller 536 via zone bus 560. Zone coordinator 518 can be connected to PEAK controller 544, bypass damper 546, COBP zone controller 548, and VAV zone controller 550 via zone bus 564.

A single model of zone coordinator 506-510 and 518 can be configured to handle multiple different types of zoning systems (e.g., a VAV zoning system, a COBP zoning system, etc.). Each zoning system can include a RTU, one or more zone controllers, and/or a bypass damper. For example, zone coordinators 506 and 510 are shown as Verasys VAV engines (VVEs) connected to VAV RTUs 522 and 540, respectively. Zone coordinator 506 is connected directly to VAV RTU 522 via zone bus 556, whereas zone coordinator 510 is connected to a third-party VAV RTU 540 via a wired input 568 provided to PEAK controller 534. Zone coordinators 508 and 518 are shown as Verasys COBP engines (VCEs) connected to COBP RTUs 526 and 552, respectively. Zone coordinator 508 is connected directly to COBP RTU 526 via zone bus 558, whereas zone coordinator 518 is connected to a third-party COBP RTU 552 via a wired input 570 provided to PEAK controller 544.

Zone controllers 524, 530-532, 536, and 548-550 can communicate with individual BMS devices (e.g., sensors, actuators, etc.) via sensor/actuator (SA) busses. For example, VAV zone controller 536 is shown connected to networked sensors 538 via SA bus 566. Zone controller 536 can communicate with networked sensors 538 using a MSTP protocol or any other communications protocol. Although only one SA bus 566 is shown in FIG. 5, it should be understood that each zone controller 524, 530-532, 536, and 548-550 can be connected to a different SA bus. Each SA bus can connect a zone controller with various sensors (e.g., temperature sensors, humidity sensors, pressure sensors, light sensors, occupancy sensors, etc.), actuators (e.g., damper actuators, valve actuators, etc.) and/or other types of controllable equipment (e.g., chillers, heaters, fans, pumps, etc.).

Each zone controller 524, 530-532, 536, and 548-550 can be configured to monitor and control a different building zone. Zone controllers 524, 530-532, 536, and 548-550 can use the inputs and outputs provided via their SA busses to monitor and control various building zones. For example, a zone controller 536 can use a temperature input received from networked sensors 538 via SA bus 566 (e.g., a measured temperature of a building zone) as feedback in a temperature control algorithm. Zone controllers 524, 530-532, 536, and 548-550 can use various types of control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control a variable state or condition (e.g., temperature, humidity, airflow, lighting, etc.) in or around building 10.

Plant with Self-Optimizing Control (SOC)

Figure 6:
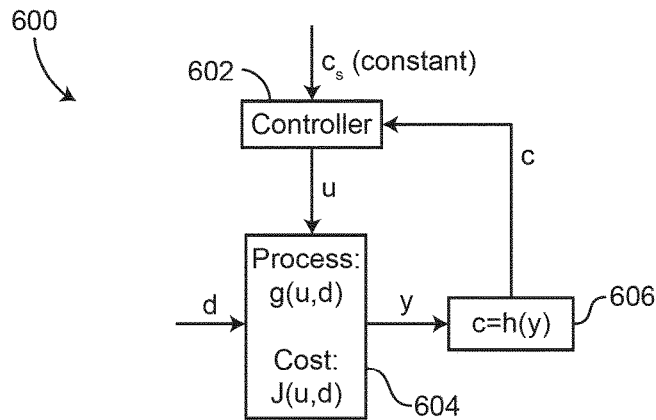
FIG. 6 is a block diagram of a self-optimizing system, according to some embodiments.

Referring now to FIG. 6, a block diagram of a self-optimizing (SO) system 600 is shown, according to some embodiments. SO system 600 includes a controller 602, a plant 604 (represented by a transfer function block), and a self-optimizing variable controller 606, according to some embodiments. SO system 600 is configured such that both control an optimization objectives are satisfied simultaneously through the regulator action of a feedback controller. Controller 602 receives a value of a constant $c_s$, a value of a self-optimizing variable c, and determines a value of an input/manipulated variable u based on the value of the constant $c_s$ and the value of the self-optimizing (SO or SOC) variable c and inputs the manipulated variable u to plant 604, according to some embodiments. Plant 604 receives the manipulated variable u and a disturbance d and produces values of an output variable y, according to some embodiments. In some embodiments, the value of the output variable y is produced at a cost/referred to as a "performance variable." In some embodiments, controller 602 is a feedback controller (e.g., a PI controller, a PID controller, etc.) that receives the SO variable c from SO variable controller 606 and the constant $c_s$ and determines the manipulated/input variable u based on the SO variable c and the constant $c_s$. In some embodiments, SO variable controller 606 is configured to determine the value of the self-optimizing variable c based on the value of the output variable y. In some embodiments, plant 604 includes various building equipment that serve one or more zones of a building (e.g., as shown in FIGS. 1-5).

Self-optimizing system 600 is a control scheme that drives a process near optimal operating conditions regardless of disturbances, according to some embodiments. This is achieved by calculating a gradient of the performance variable J and controlling/driving the gradient to zero by manipulation of the process inputs (e.g., u), according to some embodiments.

In some embodiments, the outputs (i.e., the values of the output variable y) and the inputs (i.e., the values of the manipulated variable u and the disturbance d) of plant 604 are represented by Equation (1):

$$y=g(u,d) \qquad (1)$$

where y is a vector of values of the output variable y, u is a vector of values of the manipulated/input variable u, d is a vector of values of the disturbance d, and g is a function that relate u and d to y. In some embodiments, the performance variable J is determined by Equation (2):

$$J=f(u,d) \qquad (2)$$

where J is the performance variable, u is the vector of values of the manipulated variable u, d is the vector of values of the disturbance d, and f is a function that relates u and d to J. In some embodiments, the performance variable J is referred to as a "cost."

In some embodiments, the self-optimizing control (SOC) variable c is a function of the values of the output variable and can be calculated using Equation (3):

$$c=h(y) \qquad (3)$$

where y is the vector of values of the output variable y, c is the vector of values of the SOC variable, and h is a function that relates c to y.

In some embodiments, the SOC variable can be determined by tracking and enforcing necessary conditions of optimality (NCO). In some embodiments, one of the NCO is that the gradient of the performance variable J with respect to the input u must be zero. In some embodiments, this is equivalent to defining the SOC variable c as a partial derivative of the performance variable J with respect to the inputs u as shown in Equation (4):

$$c = \frac{\partial J}{\partial u^T} \qquad (4)$$

where $u^T$ is the vector of values of the input/manipulated variable u transposed, and J is the performance variable. It should be noted that the terms "derivative," "derive," etc., can be used interchangeably with the term "gradient" throughout the present disclosure.

In some embodiments, partial derivatives are used because the performance variable J is a function of both the process inputs u and disturbances d. In some embodiments, the self-optimizing variables are a linear combination of the process measurements:

$$c = h_0 + H\Delta y \qquad (5)$$

where $\Delta y$ is a vector of values of a difference between a value of the output variable y and a nominal value of the output variable y*, $h_0$ is an offset vector, and H is a matrix that includes measurement weights (e.g., weights of the output variable y). In some embodiments, $\Delta y = y - y^*$. In some embodiments, $h_0$, H, and y* are calculated based on operational data.

In some embodiments, the nominal value of the output variable y* is chosen as the optimal operating condition for a given disturbance d*. This implies that the offset value of the SOC variable is 0 (i.e., $h_0 = 0$) and the nominal value of the output variable is the optimal value of the output variable (i.e., $y^* = y^{opt}$). In some embodiments, the nominal point y* can be any optional point of plant 604 (e.g., $y^* = y^r$ where $y^r$ is an optimal or non-optimal reference point), as described in greater detail with reference to U.S. application Ser. No. 16/131,927, filed Sep. 14, 2018, the entire disclosure of which is incorporated by reference herein.

In some embodiments, the expression of the SOC variable c as shown in Equation (5) is obtained from modeling the performance variable J and measurements of the output variable y using Taylor approximations.

As shown in Equation (4) above, the SOC variable c is a function of the manipulated/input variable u. This implies that a function $J = G_J(u)$ exists that predicts J solely from u, according to some embodiments. c can be calculated using Equation (6) below:

$$c = \frac{dG_J(u)}{du^T} \qquad (6)$$

according to some embodiments.

However, the values of the output variables y are also a function of u, according to some embodiments. This implies that J can be modeled as a function of u and y as shown in Equation (7) below:

$$J = F_J(u, y) \qquad (7)$$

where $F_J$ is a function that relates u and y to J, according to some embodiments.

This implies that the SOC variable can be calculated as the total derivative of J with respect to u expressed as:

$$c = \frac{dJ}{du^T} = \frac{\partial J}{\partial u^T} + \frac{\partial J}{\partial y^T} \frac{dy}{du^T} \qquad (8)$$

where:

$$y = F_y(u) \qquad (9)$$

according to some embodiments.

In some embodiments, data collected from a controlled process over a time duration can be used to identify the functions $F_J$ and $F_y$ and the SOC variable c can be calculated as:

$$c = \frac{\partial F_J(u, y)}{\partial u^T} + \frac{\partial F_J(u, y)}{\partial y^T} \frac{dF_y(u)}{du^T} \qquad (10)$$

according to some embodiments.

In some embodiments, $F_J(u, y)$ and $F_y(u)$ as shown in Equation (10) above are any type of predictive function that can be derived with respect to their inputs (i.e., $y^T$ and $u^T$, respectively). For example, $F_J(u, y)$ and $F_y(u)$ may be obtained from any of a linear regression, a non-linear regression, a partial least square fit, a neural network, a Taylor expansion, support vector machines, K-nearest neighbors regression, regression trees, generalized linear models, random forests, etc., or any other type of process, method, regression, etc., which can be used to determine a model. Any process, method, or regression that can determine a function $y = F(x)$ based on data collected over a time duration such that F can be derived with respect to its input x can be used to determine $F_J(u, y)$ and $F_y(u)$.

For some models, it is easy to obtain their derivative in closed form shown as:

$$F'(x) = \frac{dF(x)}{dx} \qquad (11)$$

according to some embodiments. For some models, however, it is more difficult to obtain their derivative in closed form, according to some embodiments. In some embodiments, for models that it is more difficult to obtain their derivative in closed form, the derivative can be approximated as:

$$F'(x) = \frac{F(x_0 + \Delta x) - F(x_0)}{\Delta x} \qquad (12)$$

or:

$$F'(x) = \frac{F(x_0 + \Delta x) - F(x_0 - \Delta x)}{2\Delta x} \qquad (13)$$

for small values of $\Delta x$.

Self-Optimizing Controller

Figure 7:
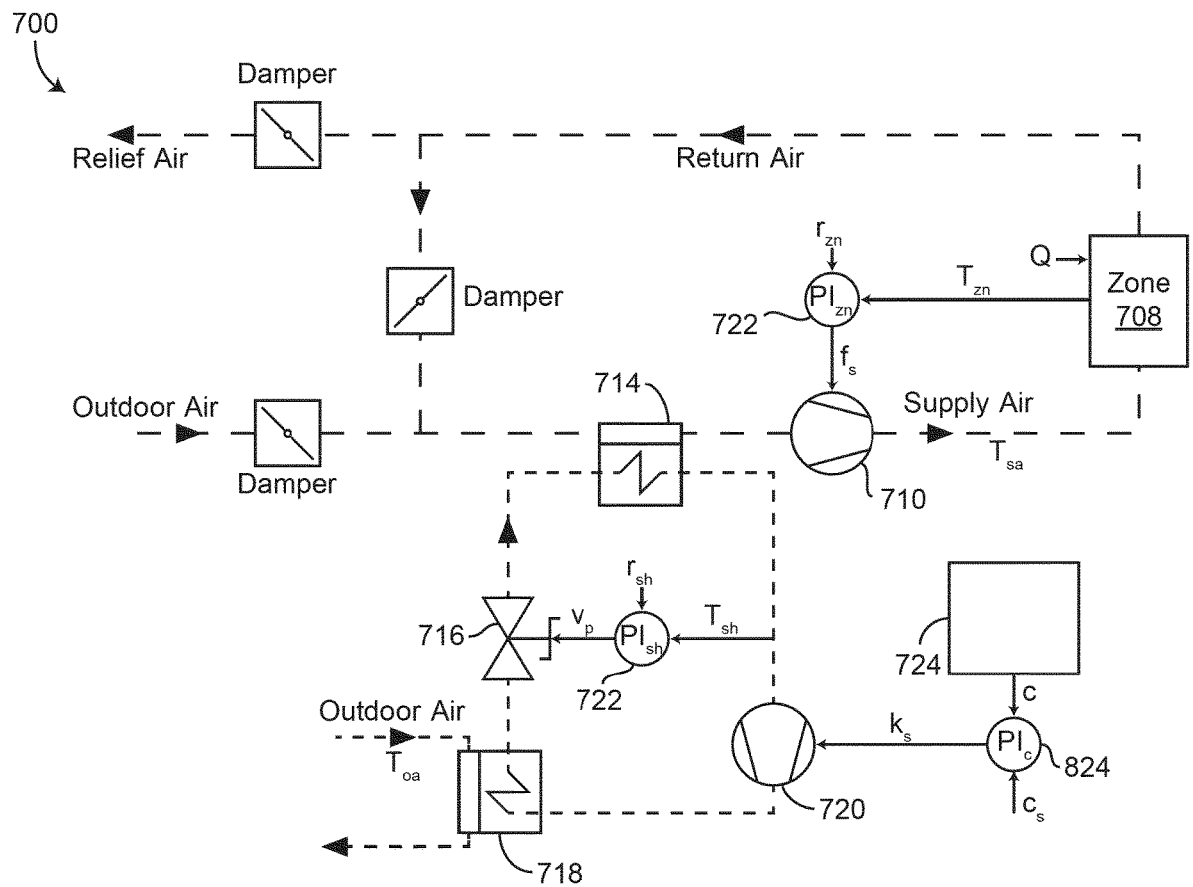
FIG. 7 is a block diagram of a VAV system under self-optimizing control, according to some embodiments.
Figure 8:
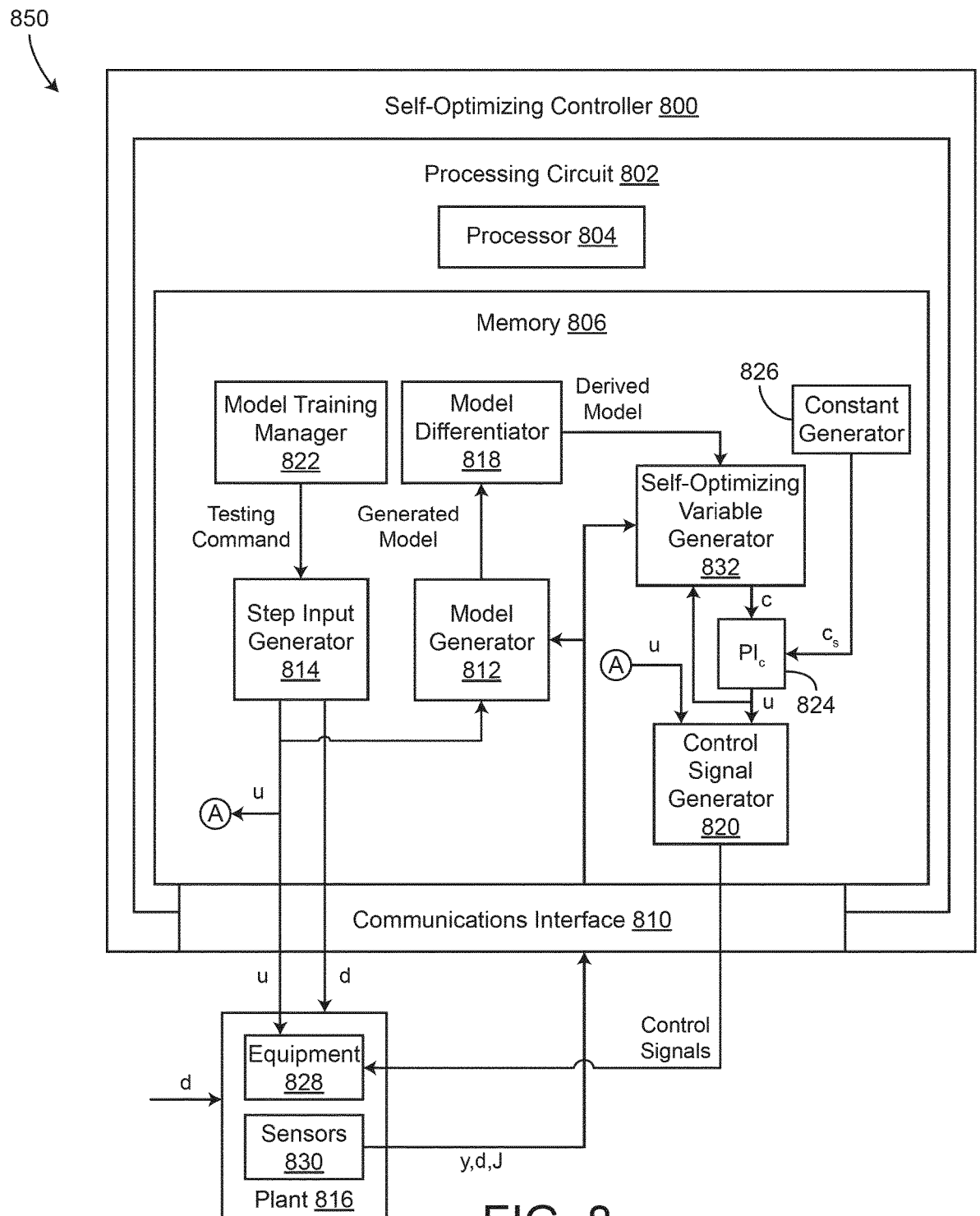
FIG. 8 is a block diagram of a plant with a self-optimizing controller, according to some embodiments.

Referring now to FIG. 8, a SOC system 850 is shown. SOC system 850 includes an SO controller 800 and a plant 816, according to some embodiments. SO controller 800 can be configured to perform self-optimizing control for plant 816. SO controller 800 is configured to generate control signals for equipment 828 of plant 816 and receive feedback information of output variable y as measured by sensors 830 of plant 816, according to some embodiments. SO controller 800 can use any of the techniques, methods, and approaches described throughout the present disclosure to generate control signals for plant 816. For example, SO controller 800 may be configured to generate a model for each of $F_y$ and $F_J$ using neural networks (e.g., neural network 1500), Taylor expansions, a linear regression, a non-linear regression, a partial least square fit, a neural network, support vector machines, K-nearest neighbors regression, regression trees, generalized linear models, random forests, etc., according to some embodiments. In some embodiments, SO controller 800 is configured to provide a step input of the input variable u of plant 816 and a step input to the disturbance d of plant 816 to excite plant 816 over a time duration to generate/collect training data to determine the models. SO controller 800 is configured to use the training data to determine the models $F_J$ and $F_y$ and generate control signals for plant 816 (e.g., for the controllable components/elements/equipment 828 of plant 816) using the SO variable c determined based on the generated models, according to some embodiments. In some embodiments, plant 816 is plant 604. In some embodiments, plant 816 is VAV system 700 described in greater detail below with reference to FIG. 7. In some embodiments, plant 816 is an HVAC system including various HVAC equipment, as described in greater detail above with reference to FIGS. 1-5.

Referring still to FIG. 8, SO controller 800 is shown to include a communications interface 810. Communications interface 810 may facilitate communications between SO controller 800 and external applications (e.g., equipment 828 of plant 816, sensors 830 of plant 816, etc.) for allowing control and monitoring of plant 816 or any of the components, devices, equipment, sensors, etc., of plant 816. Communications interface 810 may also facilitate communications between SO controller 800 and client devices. Communications interface 800 may facilitate communications between SO controller 800 and building subsystems (e.g., building subsystems 428 such as HVAC, lighting security, lifts, power distribution, business, etc.).

Communications interface 810 can be or include wired or wireless communications interfaces (e.g., jacks, antennas, transmitters, receivers, transceivers, wire terminals, etc.) for conducting data communications with plant 816 or other external systems or devices. In various embodiments, communications via communications interface 810 can be direct (e.g., local wired or wireless communications) or via a communications network (e.g., a WAN, the Internet, a cellular network, etc.). For example, communications interface 810 can include an Ethernet card and port for sending and receiving data via an Ethernet-based communications link or network. In another example, communications interface 810 can include a Wi-Fi transceiver for communicating via a wireless communications network. In another example, communications interface 810 can include cellular or mobile phone communications transceivers. In one embodiment, communications interface 810 is a power line communications interface. In other embodiments, communications interface 810 is an Ethernet interface.

Still referring to FIG. 8, SO controller 800 is shown to include a processing circuit 802 including a processor 804 and memory 806. Processing circuit 802 can be communicably connected to communications interface 810 such that processing circuit 802 and the various components thereof can send and receive data via communications interface 810. Processor 804 can be implemented as a general purpose processor, an application specific integrated circuit (ASIC), one or more field programmable gate arrays (FPGAs), a group of processing components, or other suitable electronic processing components.

Memory 806 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 806 can be or include volatile memory or non-volatile memory. Memory 806 can include database components, object code components, script components, or any other type of information structure for supporting the various activities and information structures described in the present application. According to some embodiments, memory 806 is communicably connected to processor 804 via processing circuit 802 and includes computer code for executing (e.g., by processing circuit 802 and/or processor 804) one or more processes described herein.

In some embodiments, SO controller 800 is implemented within a single computer (e.g., one server, one housing, etc.). In various other embodiments SO controller 800 can be distributed across multiple servers or computers (e.g., that can exist in distributed locations).

Referring still to FIG. 8, memory 806 is shown to include a step input generator 814. Step input generator 814 can be configured to provide a step input to plant 816 as the manipulated variable u, according to some embodiments. In some embodiments, step input generator 814 provides the step input of the manipulated variable u to control signal generator 820 and control signal generator 820 determines control signals for the various controllable elements of plant 816 to perform the step input of the manipulated variable u on plant 816. In some embodiments, providing a step input as the manipulated/input variable u to plant 816 excites plant 816 over a time duration such that training data (e.g., values of the output variable(s) y can be collected).

In some embodiments, step input generator 814 is configured to provide a step input of the disturbance d to plant 816. In some embodiments, step input generator 814 provides the step input of the disturbance d to control signal generator 820 and control signal generator 820 generates control signals to implement the step input of the disturbance d in plant 816.

In some embodiments, step input generator 814 provides the step input of the manipulated variable u and the disturbance d to plant 816 in response to receiving a command from model training manager 822 to test plant 816 to achieve training data for determining a model.

Plant 816 may represent either a model of plant 816 (e.g., in the case of a training procedure) or a physical plant. For example, during a model generation process, plant 816 may be a dynamic model of plant 816 such that both the input variable u and the disturbance d can be perturbed. In some embodiments, during the model generation process, only the input variable u is perturbed and the disturbance d is recorded (e.g., only the compressor speed $k_s$ is perturbed, and the outdoor air temperature $T_{oa}$ is recorded for VAV system 700 described in greater detail below with reference to FIG. 7). In some embodiments, when SO controller 800 is used to optimize operation of plant 816 (e.g., minimize the performance/cost variable J of plant 816), plant 816 represents a physical real-world plant. In some embodiments, plant 816 is a physical plant and the manipulated/input variable u of the plant is perturbed (e.g., with a step input) and the values of the disturbance d are monitored to collect training data to generate $F_J$ and $F_y$. In some embodiments, the models generated during the model generation process are used by SO controller 800 to determine control signals for plant 816 during operation of plant 816.

In some embodiments, the input/manipulated variable u as well as the disturbance d of plant 816 are perturbed and values of the output variable y are received from plant 816 as training data. In some embodiments, the values of the output variable y as well as the values of the input/manipulated variable u and the disturbance d used to excite plant 816 are provided to model generator 812. In some embodiments, the values of the output variable(s) y over a time duration are received from sensors 830 of plant 816.

Model generator 812 is configured to use the values of the output variable y and the input/manipulated variable u and the disturbance d to determine $F_J$ and $F_y$, according to some embodiments. In some embodiments, model generator 812 uses neural network 1500 as described in greater detail below with reference to FIG. 15. Model generator 812 can use any regression technique described in the present disclosure to determine $J=F_J(u, y)$ and $y=F_y(u)$.

Model generator 812 is configured to determine $F_J$ and $F_y$ and provide the generated model(s) to model differentiator 818, according to some embodiments. In some embodiments, model differentiator 818 is configured to derive the models $F_J$ and $F_y$ with respect to their inputs to determine $$\frac{\partial F_J(u, y)}{\partial u^T}, \frac{\partial F_J(u, y)}{\partial y^T}, \text{ and } \frac{dF_y(u)}{du^T}.$$

In some embodiments, if the models $F_J$ and $F_y$ are in closed form, model differentiator 818 is configured to use Equation (11) to determine the derivatives of models $F_J$ and $F_y$. In some embodiments, if the models $F_J$ and $F_y$ are not in closed form, model differentiator 818 uses Equation (12) or (13) to determine the derivatives of $F_J$ and $F_y$ with respect to their input(s).

Referring still to FIG. 8, model differentiator 818 is shown providing the derived models to self-optimizing variable generator 832. Self-optimizing variable generator 832 is configured to use the derived models received from model differentiator 818 to construct a model to determine the SO variable c and use the constructed model to generate values of the SO variable c, according to some embodiments. In some embodiments, self-optimizing constant generator 832 constructs Equation (10) based on the derived models $F_J$ and $F_y$. In some embodiments, self-optimizing constant generator 832 uses the derived models $F_J$ and $F_y$ to determine $h_0$ and H for use in Equation (5).

During operation of plant 816, self-optimizing variable generator 832 is configured to receive values of the output variable y (e.g., as measured by sensors 830 of plant 816) to determine values of the SO variable c. In some embodiments, self-optimizing variable generator 832 uses the model constructed based on the derived models provided by model differentiator 818. In some embodiments, self-optimizing variable generator 832 provides the determined values of the SO variable c to a feedback controller 824. Feedback controller 824 may be any of a PI controller, a PID controller, etc. In some embodiments, feedback controller 824 is controller 602 as shown in FIG. 6 and described in greater detail above. In some embodiments, feedback controller 824 receives values of a constant $c_s$ from constant generator 826. Constant generator 826 is configured to generate values of a constant $c_s$ and provide the values of the constant $c_s$ to feedback controller 824. In some embodiments, the constant $c_s$ is a desired value of the SO variable c. In some embodiments, constant generator 826 provides feedback controller 824 with $c_s=0$. In some embodiments, feedback controller 824 is or includes any of the functionality of self-optimizing control system 1200 of U.S. application Ser. No. 16/131,927, filed Sep. 14, 2018, the entire disclosure of which is incorporated by reference herein.

Feedback controller 824 is configured to determine a value of the manipulated variable u for plant 816 based on the SO variable c and the constant $c_s$, according to some embodiments. In some embodiments, feedback controller 824 provides the value of the manipulated variable u to control signal generator 820 and self-optimizing variable generator 832. Control signal generator 820 is configured to receive the value of the manipulated variable u and determine control signals for equipment 828 of plant 816 to operate equipment 828 according to the value of the manipulated variable u.

In some embodiments, self-optimizing variable generator 832 uses the value of the manipulated variable to determine the value of the SO variable c. For example, as shown in Equation (8), one of the inputs to determine the value of the SO variable c is the manipulated variable u.

Linear Regression Models Using Taylor Expansions

In some embodiments, the SO variable c can be determined using linear models obtained from Taylor expansions of first and second order, with single layer feedforward neural networks. It should be noted that this example is illustrative only, and while the self-optimizing variable can be determined using this approach, it should not be regarded as limiting. Any other regression technique that can determine a model F in the form $y=F(x)$ provided training data of y and x values can be used.

The expression of Equation (5) can be obtained if the performance variable J is modeled with a Taylor expansion of a second order with respect to y, and the measurements y with a first order Taylor expression:

$$J = F_J(u, y) = J^* + J_y^* \Delta y + \frac{1}{2} \Delta y^T J_{yy}^* \Delta y \qquad (14)$$

$$y = F_y(u) = y^* + G_u^* \Delta u \qquad (15)$$

where:

$$J_y^* = \frac{\partial J}{\partial y^T}\bigg|_{y=y^*} \qquad (16)$$

$$J_{yy}^* = \frac{\partial^2 J}{\partial y \partial y^T}\bigg|_{y=y^*} \qquad (17)$$

$$G_u^* = \frac{\partial y}{\partial u^T}\bigg|_{u=u^*} \qquad (18)$$

according to some embodiments.

Taking the derivatives of the functions of Equations (14)-(18) yields Equations (19)-(20):

$$\frac{\partial F_J(u, y)}{\partial u^T} = 0 \qquad (19)$$

$$\frac{dF_J(u, y)}{dy^T} = J_y^* + \Delta y^T J_{yy}^* \qquad (20)$$

$$\frac{dF_y(u)}{du^T} = G_u^* \qquad (21)$$

according to some embodiments.

From Equation (10) it can be determined:

$$c = (J^*_y + \Delta y^T J^*_{yy})(G^*_u) = J^*_y G^*_u + \Delta y^T J^*_{yy} G^*_u \quad (22)$$

according to some embodiments.

Assuming that:

$$h_0 = (J^*_y G^*_u)^T \quad (23)$$

$$H = (J^*_{yy} G^*_u)^T \quad (24)$$

and transposing Equation (23) yields Equation (5), according to some embodiments. Therefore, Equations (23) and (24) can be used to determine $h_0$ and H to calculate the SO variable c. In some embodiments, model generator 812 is configured to determine $h_0$ and H using Equation (23) and (24) as shown above. In some embodiments, self-optimizing variable generator 832 uses Equation (22) to determine values of the SO variable c.

SOC with Neural Networks

In some embodiments, a neural network can be used to generate the models $F_J(u, y)$ and $F_y(u)$ to predict J and y such that the SOC variable c can be calculated. In some embodiments, model generator 812 uses a neural network to determine/generate the functions $F_J(u, y)$ and $F_y(u)$ to predict J and y such that the SO variable c can be calculated. In some embodiments, model differentiator 818 is configured to derive the neural network models determined by model generator 812 using any of the methodologies described in greater detail hereinbelow. The neural network may have a single hidden layer and can predict values p from inputs x as shown in Equation (25) below:

$$p = b_p + W_p s(b_h + W_h x) \quad (25)$$

where s is an activation function, parameters $b_h$ and $b_p$ are bias weights, and parameters $W_h$ and $W_p$ are weight matrices, according to some embodiments. In some embodiments, s is a sigmoid function:

$$s(x) = \frac{1}{1 + e^{-x}} \quad (26)$$

where x is the input of the sigmoid function. In some embodiments, if the input to s(x) is a vector (i.e., x), the function is applied to each element of the vector.

The derivative of the outputs with respect to the inputs for the neural network as shown in Equation (25) can be determined as:

$$\frac{dp}{dx^T} = W_p \text{Diag}(z \circ (v_1 - z)) W_h \quad (27)$$

where $z = s(b_h + W_h x)$, $v_1$ is a vector of the same size as z with all elements of a value of 1, Diag( ) is the diagonal operator that converts its vector argument into a diagonal matrix, and $\circ$ is the Hadamard product operator, according to some embodiments.

In order to build the neural network for $F_J(u, y)$, u and y are gathered in the input vector:

$$x = \begin{bmatrix} u \\ y \end{bmatrix} \quad (28)$$

and the neural network is built as:

$$J = F_J(x) \quad (29)$$

according to some embodiments. In some embodiments, model generator 812 is configured to build the neural network model based on values of y and u received from plant 816 over a time period. In some embodiments, the values of y and u are received after perturbing the manipulated variable u.

The partial derivatives of the neural network with respect to the inputs u and y are:

$$\frac{\partial F_J(x)}{\partial u^T} = \frac{dp}{dx^T} \frac{\partial x}{\partial u^T} \quad (30)$$

$$\frac{\partial F_J(x)}{\partial y^T} = \frac{dp}{dx^T} \frac{\partial x}{\partial y^T} \quad (31)$$

according to some embodiments. In some embodiments, model differentiator 818 is configured to determine the partial derivatives of the neural network with respect to the inputs u and y to achieve Equations (30) and (31) using any of the methodologies and techniques described hereinbelow.

The derivative of the neural network with respect to x is shown in Equation (27) above, and the derivatives of x with respect to u and y are shown in Equations (34) and (35) below:

$$\frac{\partial x}{\partial u} = \begin{bmatrix} I_u \\ 0 \end{bmatrix} \quad (32)$$

$$\frac{\partial x}{\partial y} = \begin{bmatrix} 0 \\ I_y \end{bmatrix} \quad (33)$$

where $I_u$ is an identity matrix with size and number of elements in u, and $I_y$ is an identity matrix with size and number of the measure variables in y, according to some embodiments.

Neural Network Example

Figure 15:
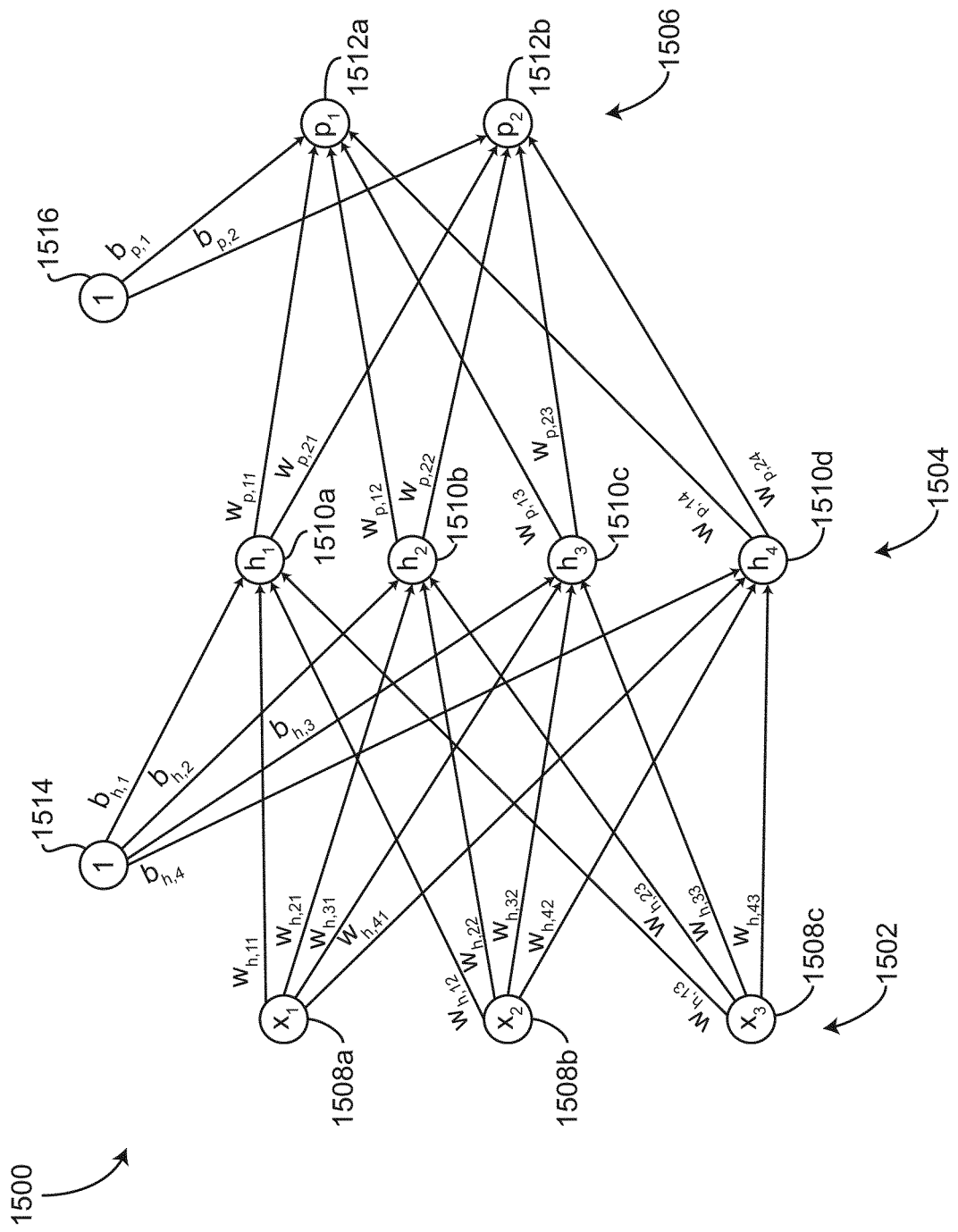
FIG. 15 is a block diagram of a neural network that the self-optimizing controller of FIG. 8 can use to determine the self-optimizing variable, according to some embodiments.

Referring now to FIG. 15, a neural network 1500 that can be used by model generator 812 to determine $F_J$ and $F_y$ is shown, according to some embodiments. Model generator 812 can be configured to generate neural network 1500 using any of the techniques and methodologies described hereinbelow. Likewise, model differentiator 818 can be configured to derive the neural network model generator from neural network 1500 using any of the techniques and methodologies described in greater detail hereinbelow. Neural network 1500 includes input layer 1500 having input nodes 1508a-c, hidden layer 1504 having hidden nodes 1510a-d, and output layer 1516 having output nodes 1512a-1512b. Neural network 1500 also includes weight nodes 1514 and 1516, according to some embodiments. In some embodiments, neural network 1500 has a single hidden layer 1504 with $n_h$ hidden nodes, receives $n_x$ inputs, and determines $n_p$ outputs. In some embodiments, the inputs and outputs are collected in the vectors x and p as:

$$x = [x_1 x_2 \ldots x_{n_x}]^T \quad (34)$$

$$p = [p_1 p_2 \ldots p_{n_p}]^T \quad (35)$$

The output p is determined from the input x with Equations (36)-(38) as shown below:

$$h = b_h + W_h x \qquad (36)$$

$$z = s(h) \qquad (37)$$

$$p = b_p + W_p z \qquad (38)$$

according to some embodiments.

Equation (36) shown above performs a linear combination of the inputs and adds a bias to it, according to some embodiments. The bias $b_h$ and weight matrix $W_h$ are design parameters of the neural network and are defined as:

$$b_h = [\, b_{h,1} \ \ b_{h,2} \ \ \ldots \ \ b_{h,n_h} \,]^T \qquad (39)$$

$$W_h = \begin{bmatrix} W_{h,11} & W_{h,12} & \ldots & W_{h,1n_x} \\ W_{h,21} & W_{h,22} & \ldots & W_{h,1n_x} \\ \vdots & \vdots & \ddots & \vdots \\ W_{h,n_h 1} & W_{h,n_h 2} & \ldots & W_{h,n_h n_x} \end{bmatrix} \qquad (40)$$

and the resulting vector is represented as:

$$h = [h_1 h_2 \ldots h_{n_h}]^T \qquad (41)$$

according to some embodiments.

Equation (37) represents the transformation that occurs in nodes 1510 of hidden layer 1504, according to some embodiments. In some embodiments, an activation function s(x) (e.g., the activation function as shown in Equation (26)) is applied to each of the calculated values $h_i$ (e.g., to an arbitrary calculated value $h_i$) and leads to a value $z_i = s(h_i)$. In some embodiments, the activation function is the sigmoid function as shown in Equation (26). The activation function (e.g., the sigmoid function) is applied to each of the calculated values of h to determine:

$$z = [z_1 z_2 \ldots z_{n_h}]^T = [s(h_1) s(h_2) \ldots s(h_{n_h})]^T \qquad (42)$$

according to some embodiments.

In some embodiments, Equation (38) represents when the outputs values are obtained by linearly combining the elements in z and adding another bias. The matrix $W_p$ and bias $b_p$ are also design parameters of neural network 1500, and are defined as:

$$b_p = [\, b_{p,1} \ \ b_{p,2} \ \ \ldots \ \ b_{p,n_p} \,]^T \qquad (43)$$

$$W_p = \begin{bmatrix} W_{p,11} & W_{p,12} & \ldots & W_{p,1n_h} \\ W_{p,21} & W_{p,22} & \ldots & W_{p,1n_h} \\ \vdots & \vdots & \ddots & \vdots \\ W_{p,n_p 1} & W_{p,n_p 2} & \ldots & W_{p,n_p n_h} \end{bmatrix} \qquad (44)$$

according to some embodiments.

Neural network 1500 as shown in FIG. 15 represents a case when, for the sake of simplicity, the network has three input nodes 1508a-1508c, one hidden layer 1504, and four hidden nodes 1510a-1510d with two output nodes 1512a-1512b, according to some embodiments. In some embodiments, the number of layers and nodes in each layer are also design parameters of the network. It should be noted that a neural network with more or less input nodes 1508, more or less hidden layers 1504, and more or less hidden nodes 1510 than neural network 1500 as shown in FIG. 15 may be used to determine $F_J$ and $F_y$.

Neural network 1500 predicts output p for given input x, according to some embodiments. In some embodiments, this relationship is defined as:

$$F(x) = p \qquad (45)$$

as represented by Equations (36)-(38).

The gradient of F(x) with respect to x can be obtained by applying the chain rule to Equation (45):

$$\frac{dF(x)}{dx^T} = \frac{dp}{dx^T} = \frac{dp}{dz^T} \frac{dz}{dh^T} \frac{dh}{dx^T} \qquad (46)$$

according to some embodiments.

From Equations (36) and (38) it can be determined that:

$$\frac{dh}{dx^T} = W_h \qquad (47)$$

$$\frac{dp}{dz^T} = W_p \qquad (48)$$

according to some embodiments.

The derivative of z with respect to $h^T$ is a matrix where each element is the derivative of the $i^{th}$ element of z with respect to the $j^{th}$ element of h, according to some embodiments. Since $z_i = s(h_i)$:

$$\frac{dz_i}{dh_j} = 0 \ \text{for} \ i \neq j \qquad (49)$$

which indicates that the derivative matrix is diagonal, according to some embodiments. The diagonal elements are obtained from the derivative of the activation function s(x), according to some embodiments. The derivative of a sigmoid activation function is:

$$\frac{ds(x)}{dx} = s(x)(1 - s(x)) \qquad (50)$$

therefore:

$$\frac{dz_i}{dh_i} = z_i(1 - z_i) \qquad (51)$$

according to some embodiments.

The derivative of z with respect to $h^T$ is the diagonal matrix:

$$\frac{dz}{dh^T} = \text{Diag}([z_1(1-z_1) \ z_2(1-z_2) \ \ldots \ z_{n_h}(1-z_{n_h})]) \qquad (52)$$

which can be expressed as:

$$\frac{dz}{dh^T} = \text{Diag}(z \circ (v_1 - z)) \qquad (53)$$

where ○ represents the Hadamard product operator, and $v_1$ is a column vector with $n_h$ elements that are all a value of one, according to some embodiments.

The final expression for the derivative of F(x) is:

$$\frac{dF(x)}{dx^T} = W_p \text{Diag}(z \circ (v_1 - z))W_h \quad (54)$$

according to some embodiments. In some embodiments, model differentiator 818 is configured to use Equation (54) to determine the derivatives of the neural network model generated by model generator 812 using any of the techniques and methodologies described in greater detail hereinabove.

VAV System with Self Optimizing Control

Referring now to FIG. 7, a VAV system 700 is shown, according to some embodiments. SOC can be applied to VAV system 700 and performed by SO controller 724, according to some embodiments. In some embodiments, SO controller 724 is SO controller 800 or includes any of the functionality of SO controller 800. In some embodiments, VAV system 700 is a model of a real-world VAV system and the experiment described hereinbelow are for a simulation of VAV system 700 to demonstrate the efficacy of SO controller 724/SO controller 800.

VAV system 700 includes a fan 710 configured to pull return air and/or outdoor air across an evaporator 714 to provide supply air to a building zone 708, according to some embodiments. Fan 710 operates at a fan speed $f_s$, according to some embodiments. The fan speed $f_s$ may be controllable. In some embodiments, a PI controller 722 receives a temperature value $T_{zn}$ of zone 708 and a setpoint zone temperature $r_{zn}$ and determines $f_s$ for fan 710 based on the temperature $T_{zn}$ and the setpoint zone temperature $r_{zn}$. Evaporator 714 is coupled to a compressor 720, a condenser 718, and an expansion valve 716, according to some embodiments. Compressor 720 operates at a controllable compressor speed $k_s$ and compresses a refrigerant, according to some embodiments. The refrigerant flows through condenser 718, where the refrigerant condenses as it transfers heat to outdoor air at the outdoor air temperature $T_{oa}$, according to some embodiments. The refrigerant then passes through expansion valve 716, which has a controllable valve position $v_p$, causing expansion and cooling of the refrigerant, according to some embodiments. In some embodiments, $v_p$ (the position of expansion valve 716) is determined by feedback controller 722 which receives a setpoint superheated temperature $r_{sh}$ and a temperature value of the superheated air $T_{sh}$ and performs feedback control (e.g., PI control) to determine $v_p$. The refrigerant then passes through evaporator 714, where the refrigerant removes heat from the return air and/or outdoor air pulled by fan 710, according to some embodiments. This results in supply air of supply air temperature $T_{sa}$ being supplied to building zone 708 by fan 710 at a rate determined by the fan speed $f_s$, according to some embodiments.

In the examples and experimental results included below, the optimization goal for VAV system 700 is to minimize energy consumption while still satisfying load requirements, according to some embodiments. Here, the optimization objective is defined as maximization of the coefficient of performance (COP) of the system, according to some embodiments. The COP is defined as the ratio of the heat removed in the evaporator divided by the combined amount of power exerted by the compressor and fan, $$COP = \frac{Q_{evap}}{W_k + W_f},$$

according to some embodiments.

The COP can be increased by increasing the amount of heat removed in evaporator 714 while the power used by compressor 720 and fan 710 is kept constant, reduced, or allowed to increase but not as much as the removed heat. These changes are achieved by changing the setpoints to the superheat temperature $r_{sh}$, supply air temperature $r_{sa}$ and zone temperature $r_{zn}$, respectively, according to some embodiments. Due to comfort constraints, the value of $r_{zn}$ cannot be changed to achieve the optimization goal, according to some embodiments. The superheat setpoint $r_{sh}$ could be adjusted, as long as it is kept positive; furthermore, lower superheat values lead to a better performance. Thus it makes sense to keep $r_{sh}$ constant at a small value, according to some embodiments. Therefore, the only option is to manipulate $r_{sa}$ to decrease the power used by compressor 720, according to some embodiments. By increasing the supply air temperature, the compressor speed is reduced, thereby reducing compressor power; however, the fan speed is increased, thereby increasing fan power. Optimization therefore requires finding the optimum trade-off between compressor power and fan power.

VAV system 700 includes SO controller 724, according to some embodiments. The performance variable function of VAV system 700 is a negative value of the COP of VAV system 700, the manipulated variable u is the compressor speed $k_s$, and the output variables are the supply air temperature $T_{sa}$, $f_s$, and $v_p$ as shown in Equations (55)-(57) below:

$$J = -COP \quad (55)$$

$$u = k_s \quad (56)$$

$$y = [T_{sa}, f_s, v_p]^T \quad (57)$$

where COP is the coefficient of performance of VAV system 700, $k_s$ is the input (i.e., the speed of compressor 720), $T_{sa}$ is a first output and is the temperature of the supply air, $f_s$ is a second output and is the fan speed of fan 710, and $v_p$ is the third and final output and is the position of expansion valve 716, according to some embodiments. The disturbances of VAV system 700 are the outdoor air temperature $T_{oa}$ and the cooling load Q provided to zone 708, according to some embodiments (i.e., $d = [T_{oa} \; Q]^T$).

Step changes in the inputs and disturbances can be applied to VAV system 700 in order to excite the system and obtain training data for the neural networks (e.g., neural network 1500), according to some embodiments. It some embodiments, the step changes in the inputs and disturbances are applied by SO controller 724 and/or SO controller 800 (e.g., by step input generator 814). It should be noted that the training data can be used with any of the other modelling techniques (e.g., linear regression, least partial squares regression, etc.), to determine parameters for $F_J$ and $F_y$, according to some embodiments. If a neural network similar to neural network 1500 with a single hidden layer having seven nodes is used, the obtained parameters for $F_J(u, y)$ may be:

$$b_h = [\; b_{h,1} \quad b_{h,2} \quad b_{h,3} \quad b_{h,4} \quad b_{h,5} \quad b_{h,6} \quad b_{h,7} \;]^T = \quad (58)$$
$$[\; 5.46 \quad 0.11 \quad 0.63 \quad 1.48 \quad 0.47 \quad 1.01 \quad 2.04 \;]^T$$

-continued and:

$$W_h = \begin{bmatrix} W_{h,11} & W_{h,12} & W_{h,13} & W_{h,14} & W_{h,15} & W_{h,16} & W_{h,17} \\ W_{h,21} & W_{h,22} & W_{h,23} & W_{h,24} & W_{h,25} & W_{h,26} & W_{h,27} \\ W_{h,31} & W_{h,32} & W_{h,33} & W_{h,34} & W_{h,35} & W_{h,36} & W_{h,37} \end{bmatrix}^T = \qquad (59)$$

$$\begin{bmatrix} -0.39 & 0.00 & -0.31 & -0.25 & 0.12 & -0.03 & -0.29 \\ -0.02 & -0.01 & -1.26 & 1.32 & 1.49 & 0.27 & 3.47 \\ 0.35 & 0.90 & -0.36 & 0.37 & 0.54 & 1.36 & 0.87 \\ 2.66 & -1.00 & -0.40 & -0.26 & -4.59 & -1.36 & -4.18 \end{bmatrix}^T$$

and:

$$W_p = [W_{p,11}\ W_{p,12}\ W_{p,13}\ W_{p,14}\ W_{p,15}\ W_{p,16}\ W_{p,17}] = \qquad (60)$$
$$[-4.30\ 1.57\ 2.88\ -1.28\ -4.72\ 2.30\ -4.53]$$

and:

$$b_p = [b_{p,1}] = [0.83] \qquad (61)$$

according to some embodiments.

Likewise, for $F_y(u)$, the parameters can be obtained from the neural network as:

$$b_h = [b_{h,1}\ b_{h,2}\ b_{h,3}\ b_{h,4}\ b_{h,5}\ b_{h,6}\ b_{h,7}]^T = \qquad (62)$$
$$[-0.53\ 2.65\ 3.53\ -2.04\ 1.36\ 3.05\ 8.36]^T$$

and:

$$W_h = [W_{h,11}\ W_{h,12}\ W_{h,13}\ W_{h,14}\ W_{h,15}\ W_{h,16}\ W_{h,17}]^T = \qquad (63)$$
$$[1.01\ -3.36\ -17.64\ 3.06\ -2.76\ -3.69\ -16.75]^T$$

and:

$$W_p = \begin{bmatrix} W_{p,11} & W_{p,12} & W_{p,13} & W_{p,14} & W_{p,15} & W_{p,16} & W_{p,17} \\ W_{p,21} & W_{p,22} & W_{p,23} & W_{p,24} & W_{p,25} & W_{p,26} & W_{p,27} \\ W_{p,31} & W_{p,32} & W_{p,33} & W_{p,34} & W_{p,35} & W_{p,36} & W_{p,37} \end{bmatrix} = \qquad (64)$$

$$\begin{bmatrix} -1.03 & 5.86 & 12.68 & -4.01 & 4.08 & 5.42 & 22.70 \\ -0.37 & -0.20 & -0.33 & 0.20 & -0.09 & 0.71 & 0.63 \\ 0.45 & 0.18 & 0.18 & -0.01 & 0.01 & -0.00 & 0.06 \end{bmatrix}$$

and:

$$b_p = [b_{p,1}\ b_{p,2}\ b_{p,3}]^T = [0.40\ 0.20\ -0.23]^T \qquad (65)$$

according to some embodiments.

VAV Simulation Result Graphs

Referring now to FIGS. 9-14, various graphs illustrating simulation results of VAV system 700 are shown. A simple test was performed by running a simulation of VAV system 700 at an initial operating condition and then changing the outdoor air temperature $T_{oa}$, according to some embodiments. The system ran for 70,000 seconds. At 20,000 seconds, after the system had stabilized, the system was switched from a regular control mode to a SOC control mode. At 50,000 seconds, a disturbance was introduced by increasing the outdoor air temperature $T_{oa}$ by 8° C. The performance results obtained with SOC can be compared to extremum-seeking control (ESC) and a regular control structure that keeps the supply air temperature at the optimal value $T_{sa}$ of the initial conditions, as shown in FIGS. 9-14.

A regular control structure is similar to VAV system 700 but replaces SO controller 724 and feedback controller 824 with a single PI feedback controller, according to some embodiments. The PI feedback controller receives the temperature of the supply air $T_{sa}$ and a setpoint value of the temperature of the supply air $r_{sa}$ and performs feedback control to determine compressor speed $k_s$, according to some embodiments.

ESC control is similar to the regular control structure, according to some embodiments. However, ESC control includes an ESC that receives a negative value of the COP of VAV system 700, and performs ESC to determine $r_{sa}$, according to some embodiments. The $r_{sa}$ as determined by the ESC is then provided to the feedback controller to determine compressor speed $k_s$.

Figure 9:
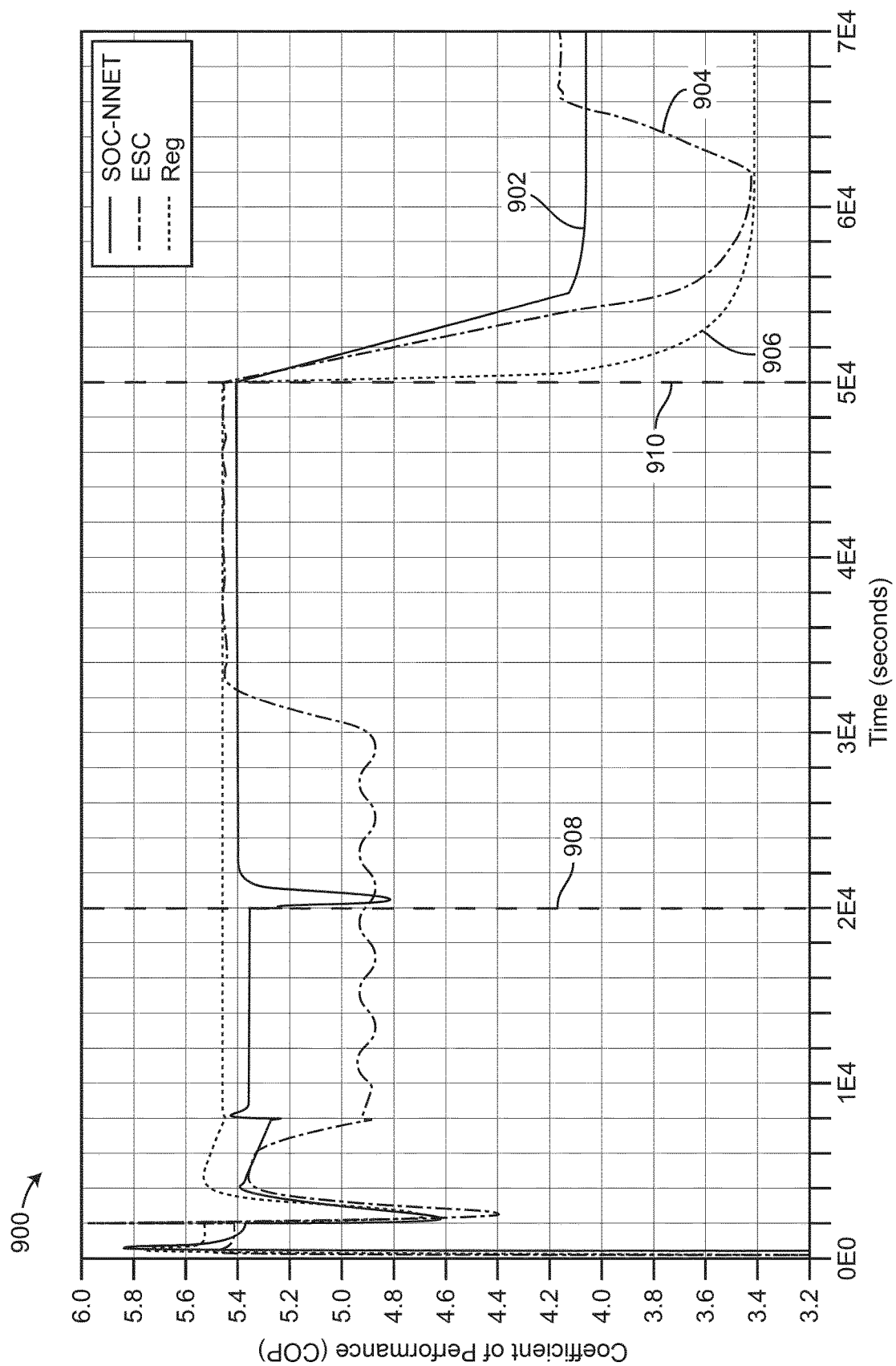
FIG. 9 is a graph of coefficient of performance with respect to time of the VAV system of FIG. 7 under self-optimizing control, extremum-seeking control, and regular control, according to some embodiments.

Graph 900 of FIG. 9 shows COP (the Y-axis) with respect to time (the X-axis) for VAV system 700 optimized using ESC (series 904), SOC (series 902), and a regular control mode (series 906). Series 902 shows COP with respect to time using the regular control mode for the first 20,000 seconds, according to some embodiments. For series 902, at 20,000 seconds, VAV system 700 transitions to SOC as represented by vertical line 908, according to some embodiments. At 50,000 seconds, the disturbance d of VAV system 700 is excited with a step input for all of series 902-906 (i.e., by increasing the outdoor air temperature $T_{oa}$ by 8° C.) as represented by vertical line 910, according to some embodiments.

Referring still to FIG. 9, series 904 (representing ESC for VAV system 700) changes from approximately 5.46 to 4.165 after the disturbance is excited at 50,000 seconds. Series 902 (representing SOC for VAV system 700) changes from a COP of 5.38 to 3.99 before and after the disturbance is excited at 50,000 seconds. For series 906 (the regular control of VAV system 700), the COP changes from 5.46 to 3.417 before and after the disturbance is excited at 50,000 seconds. As shown in graph 900, the COP results for series 902 (SOC for VAV system 700) is comparable to the COP for series 904 (ESC for VAV system 700).

Figure 10:
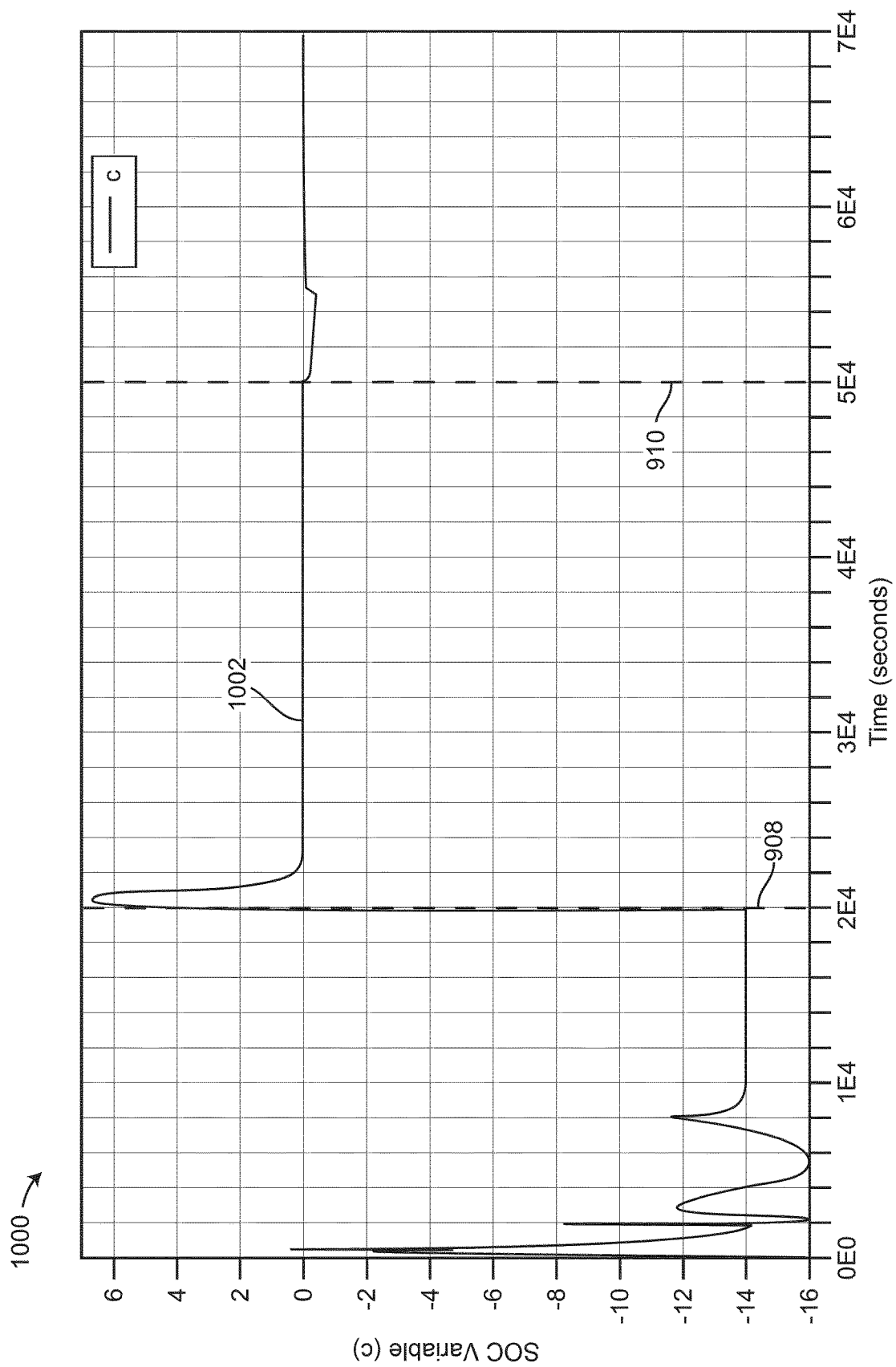
FIG. 10 is a graph of a self-optimizing variable with respect to time of the VAV system of FIG. 7, according to some embodiments.

Referring now to FIG. 10, graph 1000 shows series 1002 that illustrates the SO variable c (the Y-axis) with respect to time (the X-axis). After the control is transitioned from regular control to SOC at 20,000 seconds, the SO variable c is driven to zero within a short period of time.

Figure 11:
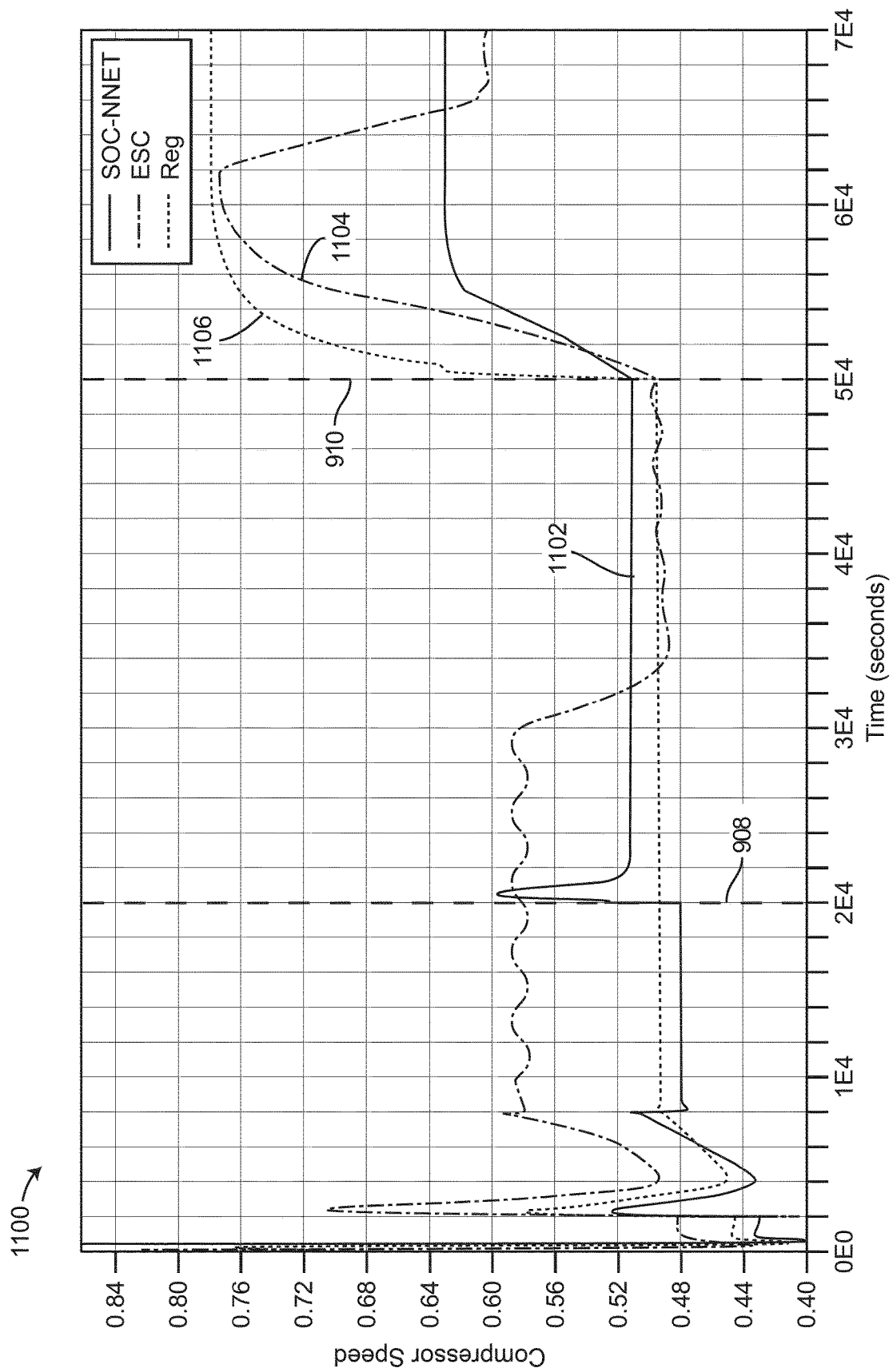
FIG. 11 is a graph of compressor speed with respect to time of the VAV system of FIG. 7 under self-optimizing control, extremum-seeking control, and regular control, according to some embodiments.
Figure 12:
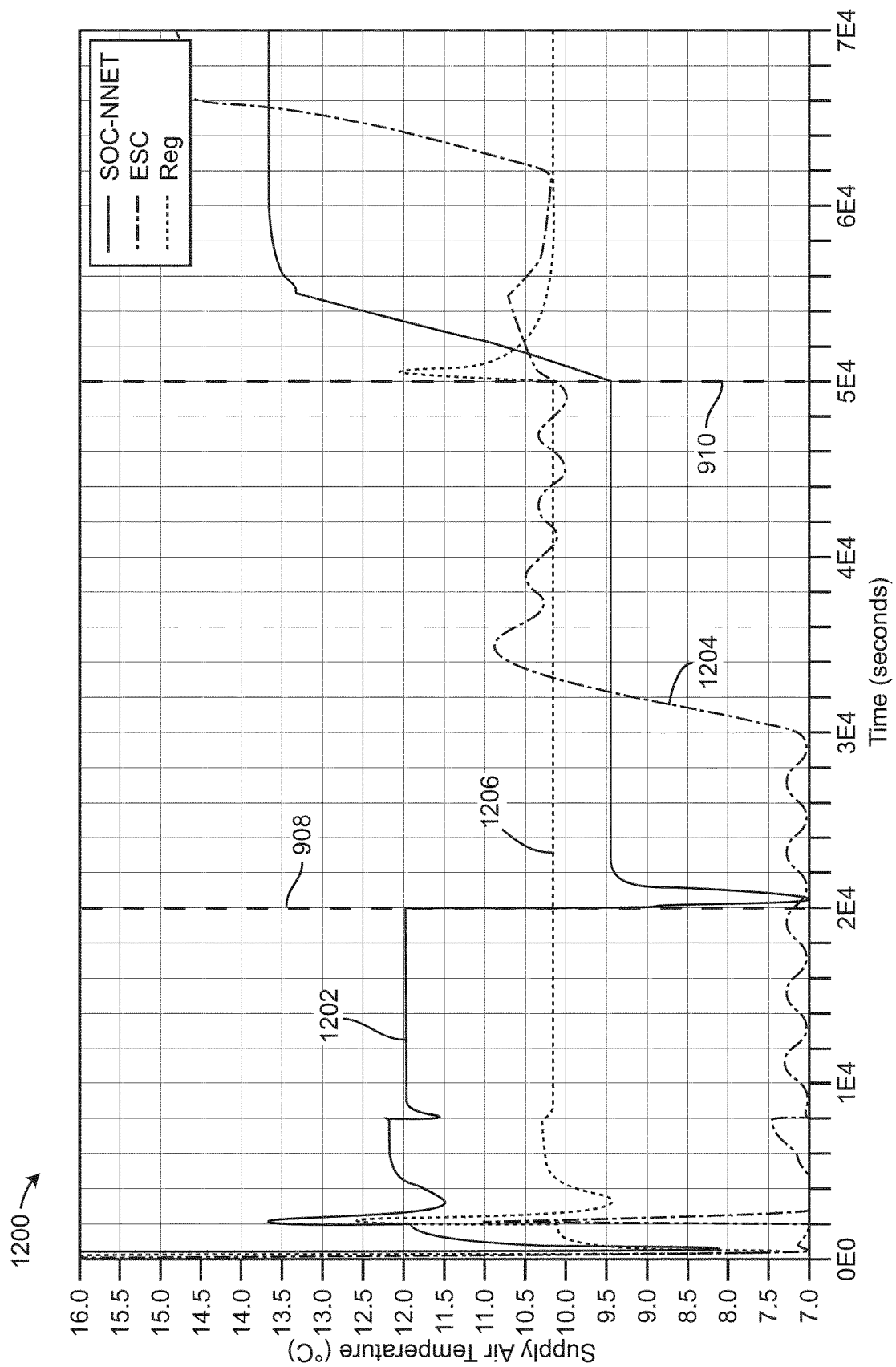
FIG. 12 is a graph of supply air temperature with respect to time of the VAV system of FIG. 7 under self-optimizing control, extremum-seeking control, and regular control, according to some embodiments.
Figure 13:
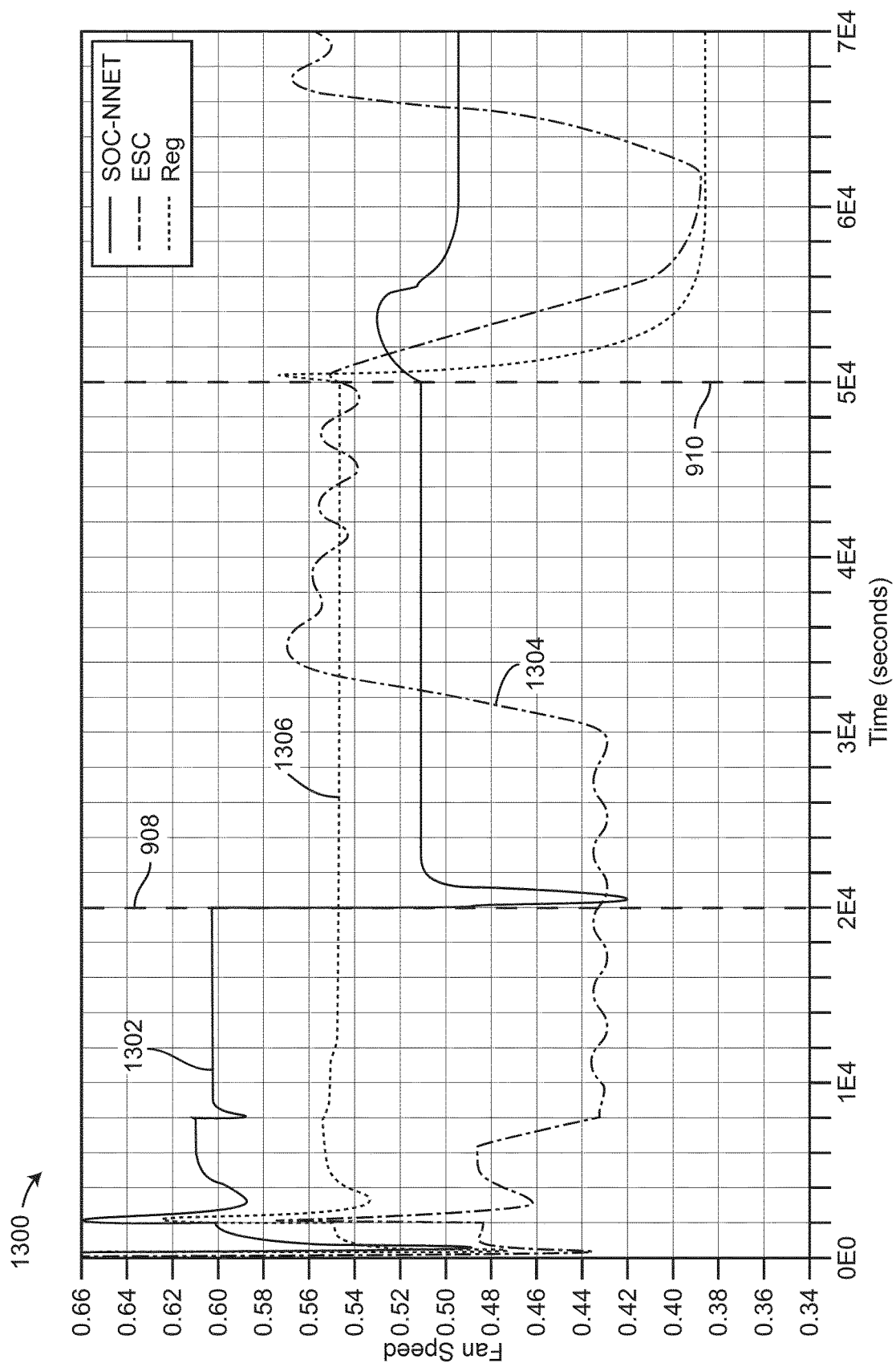
FIG. 13 is a graph of fan speed with respect to time of the VAV system of FIG. 7 under self-optimizing control, extremum-seeking control, and regular control, according to some embodiments.
Figure 14:
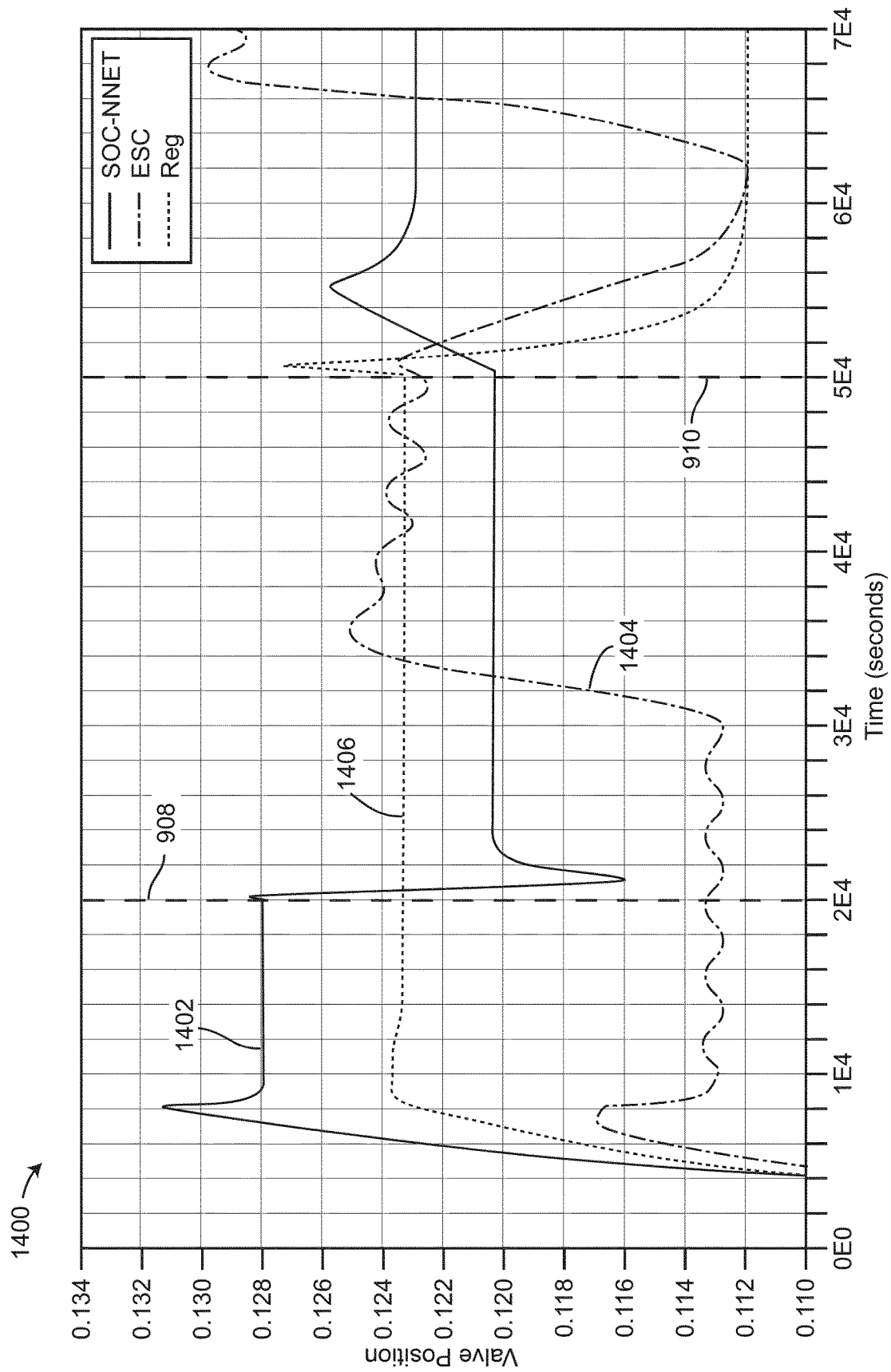
FIG. 14 is a graph of valve position with respect to time of the VAV system of FIG. 7 under self-optimizing control, extremum-seeking control, and regular control, according to some embodiments.

Referring now to FIGS. 11-14, graphs 1100-1400 illustrate the compressor speed $k_s$ (the value of the manipulated variable u, the Y-axis) with respect to time (the X-axis), and the values of the output variable y (the Y-axis) with respect to time (the supply air temperature $T_{sa}$ is shown as the Y-axis of graph 1200, the fan speed $f_s$ is shown as the Y-axis of graph 1300, and the valve position $v_p$ is shown as the Y-axis of graph 1400). Series 1102, 1202, 1302, and 1402 represent the SOC for the values of the manipulated variable u (i.e., the compressor speed $k_s$ as shown in FIG. 11) and the values of the output variable y (i.e., the supply air temperature $T_{sa}$ as shown in FIG. 12, the fan speed $f_s$ as shown in FIG. 13, and the valve position $v_p$ as shown in FIG. 14). Likewise, series 1104, 1204, 1304, and 1404 represent the results of ESC for VAV system 700 for the manipulated variable u and the various values of the output variable y. Similarly, series 1106, 1206, 1306, and 1406 represent the results of regular control for VAV system 700 for the manipulated variable u and the various values of the output variable y.

Process for Performing SO on a Plant

Figure 16:
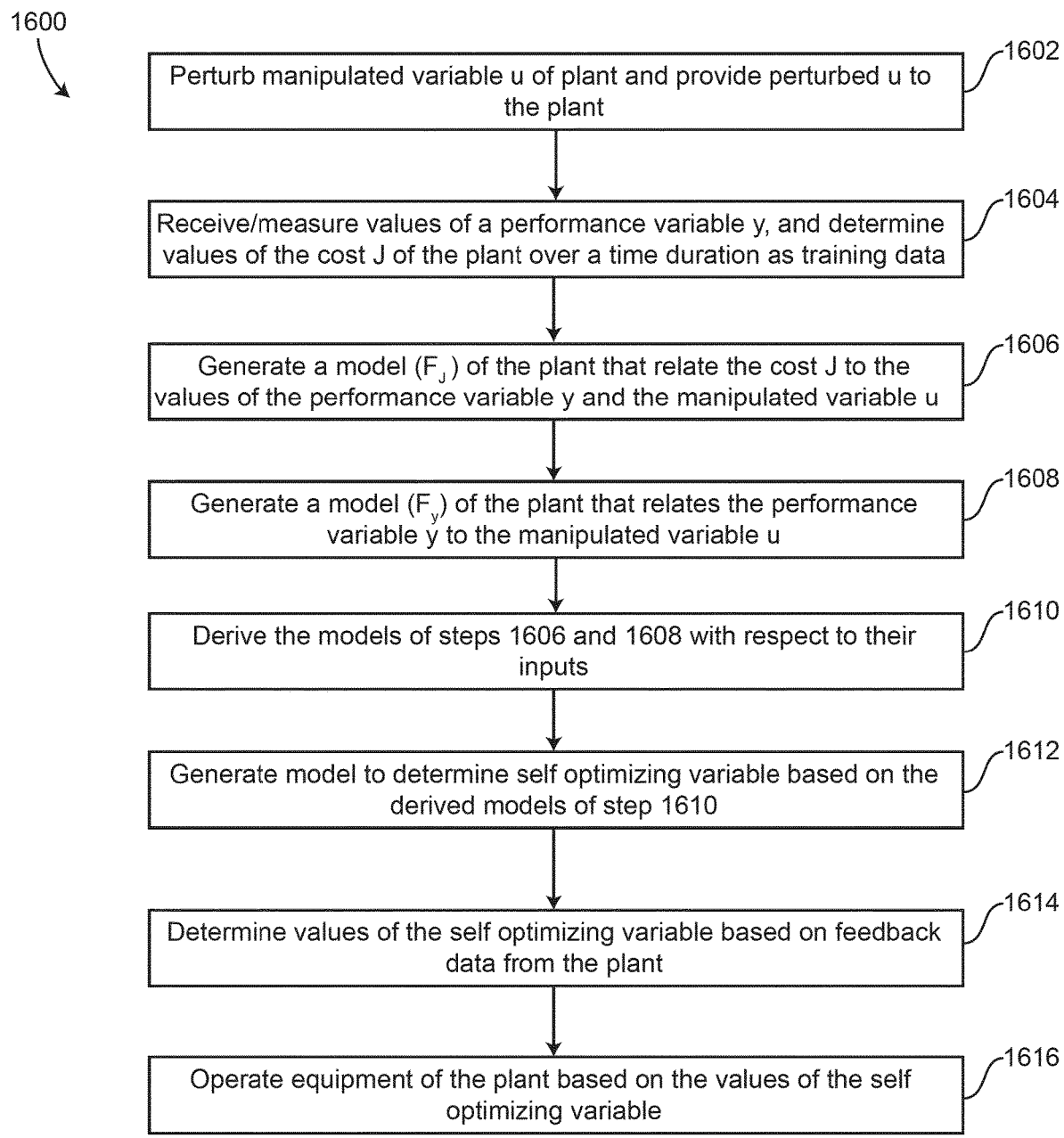
FIG. 16 is a block diagram of a process for performing self-optimizing control on a plant, according to some embodiments.

Referring now to FIG. 16, a process 1600 for performing self-optimizing control for a plant is shown. Process 1600 includes steps 1602-1616, according to some embodiments. In some embodiments, process 1600 is performed by SO controller 800 for plant 816.

Process 1600 includes perturbing the manipulated variable(s) u and providing the perturbed manipulated variable u to the plant (step 1602), according to some embodiments. In some embodiments, the manipulated variable u is perturbed with a step input. In some embodiments, step 1602 is performed by step input generator 814. In some embodiments, other excitation signals are used (e.g., a ramp input). In some embodiments, if the plant is a simulation, the disturbance d of the plant simulation is also excited (e.g., perturbed). In some embodiments, the disturbance d of the plant is perturbed with a step input. In some embodiments, the disturbance d of the plant is perturbed and input to the plant by step input generator 814. In some embodiments, the plant is plant 816, an HVAC system, VAV system 700, or any other system.

Process 1600 includes receiving/measuring values of an output variable y and determining values of the performance variable J of the plant over a time duration as training data (step 1604), according to some embodiments. In some embodiments, one or more output variables y are received/measured. In some embodiments, the values of the output variables y are measured by various sensors of the plant (e.g., by sensors 830 of plant 816). In some embodiments, the values of the output variables y are provided to model generator 812. In some embodiments, the values of the performance variable J are determined by model generator 812. In some embodiments, the values of the performance variable J are measured values and are provided to model generator 812.

Process 1600 includes generating a model $F_J$ of the plant that relates the performance variable J to the values of the output variable(s) y and the manipulated variable u (step 1606), according to some embodiments. In some embodiments, the model $F_J$ is determined based on the training data collected in step 1604. In some embodiments, the model $F_J$ is a function that relates the performance variable J to the values manipulated variable(s) u and the values of the output variable(s) y. In some embodiments, the model $F_J$ is determined by model generator 812. In some embodiments, the model $F_J$ is determined by model generator 812 using any of the techniques described throughout the present disclosure. For example, the model $F_J$ may be determined using neural network 1500, any other neural network, a linear regression, a non-linear regression, a K-nearest neighbors regression, etc., or any other regression technique that can be used to determine a function (e.g., the model $F_J$) based on training data.

Process 1600 includes generating a model $F_y$ of the plant that relates the output variable(s) y to the values of the manipulated variable u (step 1608), according to some embodiments. In some embodiments, the model $F_y$ is determined based on the training data collected in step 1604. In some embodiments, the model $F_y$ is determined by model generator 812. In some embodiments, the model $F_y$ relates the values of the output variable(s) y to values of the manipulated variable(s) u for the plant (i.e., $y=F_y(u)$). In some embodiments, the model $F_y$ is determined by model generator 812 using a neural network (e.g., neural network 1500), a linear regression, a non-linear regression, any of the other regression techniques mentioned in the present disclosure, or any other regression technique that can be used to determine $F_y$ based on training data.

Process 1600 includes deriving the models $F_J$ and $F_y$ (the models generated insteps 1606 and 1608) with respect to their inputs (step 1610), according to some embodiments. In some embodiments, step 1610 includes determining a partial derivative of $F_J$ with respect to each the manipulated variable(s) u and each of the values of the output variable(s) y (i.e., determining $$\frac{\partial J}{\partial y^T}$$

and determining $$\left.\frac{\partial J}{\partial u^T}\right).$$

In some embodiments, step 1610 includes determining a derivative of $F_y$ with respect to the manipulated variable(s) u (i.e., determining $$\left.\frac{dy}{du^T}\right).$$

In some embodiments, step 1610 is performed by model differentiator 818. In some embodiments, model differentiator 818 is configured to use any of the derivation techniques described in the present disclosure to determine the derivatives of $F_J$ and $F_y$ with respect to their inputs (e.g., using Equation (54) to determine the derivatives of each of $F_J$ and $F_y$ with respect to their inputs if $F_J$ and $F_y$ are determined by model generator 812 using neural network 1500).

Process 1600 includes generating a model (i.e., determining $h_0$ and H as shown in Equation (5) to generate a model, generating Equation (10), etc.) to determine the SO variable c based on the derivatives of the models $F_J$ and $F_y$ determined in step 1610 (step 1612), according to some embodiments. In some embodiments, step 1612 is performed by self-optimizing variable generator 832.

Process 1600 includes determining values of the SO variable c based on feedback data (e.g., values of the output variable y of the plant) using the model generated in step 1612 (step 1614), according to some embodiments. In some embodiments, step 1614 is performed by self-optimizing variable generator 832. In some embodiments, self-optimizing variable generator 832 uses the model generated in step 1612 based on the derivatives of the models $F_J$ and $F_y$ to determine values of the SO variable c.

Process 1600 includes operating equipment of the plant based on the values of the SO variable (step 1616), according to some embodiments. In some embodiments, step 1616 includes determining values of the manipulated variable u based on current values of the output variable y of the plant and constant $c_s$. In some embodiments, step 1616 is performed by feedback controller 824 and control signal generator 820. In some embodiments, the equipment is equipment 828 of plant 816. In some embodiments, the constant $c_s$ is provided to feedback controller 824 by constant generator 826. In some embodiments, the value of the constant $c_s$ is zero.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can include RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A building management system comprising:
a plant comprising building equipment operable to affect a variable state or condition of a building, the plant operating at a cost indicated by a performance variable; and
a self-optimizing controller configured to:
provide a manipulated variable as a control input to the plant and receive an output variable as a feedback from the plant;
generate a performance variable model that defines the performance variable as a function of the output variable and the manipulated variable;
generate an output variable model that defines the output variable as a function of the manipulated variable;
use the performance variable model to determine a gradient of the performance variable with respect to at least one of the output variable and the manipulated variable;
use the output variable model to determine a gradient of the output variable with respect to the manipulated variable;
generate a model of a self-optimizing variable based on the gradient of the performance variable model and the gradient of the output variable model; and
operate the building equipment of the plant to affect the variable state or condition of the building based on a value of the self-optimizing variable defined by the self-optimizing variable model.

2. The system of claim 1, wherein the performance variable model and the output variable model are generated using a regression technique.

3. The system of claim 2, wherein the regression technique is any of a linear regression, a Taylor expansion, a support vector machine, a K-nearest neighbor regression, a partial least square fit regression, a regression tree, a generalized linear model, a neural network, and a random forest.

4. The system of claim 1, wherein determining the gradient of the performance variable with respect to at least one of the output variable and the manipulated variable comprises:
determining a partial derivative of the performance variable with respect to the manipulated variable; and
determining another partial derivative of the performance variable with respect to the output variable.

5. The system of claim 1, wherein the self-optimizing controller is configured to perturb the manipulated variable with a step input to determine values of the manipulated variable over a time duration and provide the values of the manipulated variable over the time duration to the plant as the control input.

6. The system of claim 1, wherein the performance variable model is generated based on a set of values of the performance variable, the manipulated variable, and the output variable.

7. The system of claim 1, wherein the output variable model is generated based on a set of values of the output variable and the manipulated variable.

8. The system of claim 1, wherein the self-optimizing controller is configured to generate control signals for the building equipment such that the self-optimizing variable is driven toward zero.

9. The system of claim 1, wherein the output variable of the plant is influenced by a disturbance, and wherein the performance variable is influenced by the disturbance.

10. A self-optimizing controller for building equipment of a plant, the controller configured to:
provide a manipulated variable as a control input to the plant and receive an output variable as a feedback from the plant;
generate a performance variable model that defines the performance variable as a function of the manipulated variable;
generate an output variable model that defines the output variable as a function of the manipulated variable;
use the performance variable model to determine a gradient of the performance variable with respect to at least one of the output variable and the manipulated variable;

use the output variable model to determine a gradient of the output variable with respect to the manipulated variable;

generate a self-optimizing variable based on the gradient of the performance variable model and the gradient of the output variable model; and operate the building equipment of the plant to affect a variable state or condition of the building based on the value of the self-optimizing variable defined by the self-optimizing variable model.

11. The controller of claim 10, wherein the performance variable model and the output variable model are generated using a regression technique.

12. The controller of claim 11, wherein the regression technique is any of a linear regression, a Taylor expansion, a support vector machine, a K-nearest neighbor regression, a partial least square fit regression, a regression tree, a generalized linear model, a neural network, and a random forest.

13. The controller of claim 10, wherein determining the gradient of the performance with respect to at least one of the output variable and the manipulated variable comprises:
determining a partial derivative of the performance variable with respect to the manipulated variable; and
determining another partial derivative of the performance variable with respect to the output variable.

14. The controller of claim 10, wherein the controller is configured to perturb the manipulated variable with a step input to determine values of the manipulated variable over a time duration and provide the values of the manipulated variable over the time duration to the plant as the control input.

15. The controller of claim 10, wherein the performance variable model is generated based on a set of values of the performance variable, the manipulated variable, and the output variable.

16. The controller of claim 10, wherein the output variable model is generated based on a set of values of the output variable and the manipulated variable.

17. The controller of claim 10, wherein the controller is further configured to generate control signals for the building equipment such that the self-optimizing variable is driven toward zero.

18. A method for performing self-optimizing control on a plant, the method comprising:
providing a manipulated variable as a control input to the plant and receiving an output variable as a feedback from the plant;
generating a performance variable model that defines the performance variable as a function of the output variable and the manipulated variable;
generating an output variable model that defines the output variable as a function of the manipulated variable;
using the performance variable model to determine a gradient of the performance variable with respect to at least one of the output variable and the manipulated variable;
using the output variable model to determine a gradient of the output variable with respect to the manipulated variable;
generating a model of a self-optimizing variable based on the gradient of the performance variable model and the gradient of the output variable model; and
operating the building equipment of the plant to affect the variable state or condition of the building based on a value of the self-optimizing variable defined by the self-optimizing variable model.

19. The method of claim 18, wherein using the performance variable model to determine a gradient of the performance variable comprises:
determining a partial derivative of the performance variable with respect to the manipulated variable; and
determining another partial derivative of the performance variable with respect to the output variable.

20. The method of claim 18, further comprising generating control signals for the building equipment such that the self-optimizing variable is driven toward zero.

* * * * *